US012650382B2

(12) United States Patent
Sumiyoshi et al.

(10) Patent No.: US 12,650,382 B2
(45) Date of Patent: Jun. 9, 2026

(54) FLUORESCENCE POLARIZATION MEASUREMENT DEVICE, AND DEGREE OF POLARIZATION MEASUREMENT METHOD

(71) Applicant: Tianma Japan, Ltd., Kawasaki (JP)

(72) Inventors: Ken Sumiyoshi, Kawasaki (JP); Ayuko Imai, Kawasaki (JP)

(73) Assignee: TIANMA JAPAN, LTD., Kawasaki (JP)

( * ) Notice: Subject to any disclaimer, the term of this patent is extended or adjusted under 35 U.S.C. 154(b) by 46 days.

(21) Appl. No.: 18/807,328

(22) Filed: Aug. 16, 2024

(65) Prior Publication Data

US 2025/0067671 A1 Feb. 27, 2025

(30) Foreign Application Priority Data

Aug. 24, 2023 (JP) ................................. 2023-136206

(51) Int. Cl.
*G01N 21/64* (2006.01)
(52) U.S. Cl.
CPC ..... *G01N 21/6445* (2013.01); *G01N 21/6428* (2013.01); *G01N 21/6456* (2013.01)
(58) Field of Classification Search
CPC . G01N 21/6428; G01N 21/6445; G01N 33/58
See application file for complete search history.

(56) References Cited

U.S. PATENT DOCUMENTS

| | | | |
|---|---|---|---|
| 6,970,241 B1 | 11/2005 | Desa | |
| 2003/0127609 A1 | 7/2003 | El-Hage et al. | |
| 2008/0174842 A1 | 7/2008 | Cromwell et al. | |
| 2008/0318266 A1* | 12/2008 | Cullum .............. | G01N 21/6428 436/71 |

(Continued)

FOREIGN PATENT DOCUMENTS

JP 03-103765 A 4/1991

OTHER PUBLICATIONS

Osamu Wakao, "A compact fluorescence polarization analyzer with high transmittance liquid crystal layer", 2018 (Year: 2018).*

(Continued)

*Primary Examiner* — Maurice C Smith
(74) *Attorney, Agent, or Firm* — Sughrue Mion, PLLC

(57) ABSTRACT

A fluorescence polarization measurement device includes a light source unit, a polarization direction modulation element, a detector, and a controller. The polarization direction modulation element spatially modulates a polarization direction of the excitation light by a predetermined frequency, and emits, on a measurement target solution, the excitation light for which the polarization direction is spatially modulated by the predetermined frequency. The detector detects a spatial distribution of fluorescence intensity of the fluorescence having a polarization direction in a predetermined direction from among fluorescence emitted from the measurement target solution due to the excitation light. The controller extracts, from the detected spatial distribution of fluorescence intensity, a direct current component and a component having a frequency identical to the predetermined frequency, and calculates, based on the extracted component and the direct current component, a degree of polarization of the measurement target solution.

9 Claims, 13 Drawing Sheets

(56) References Cited

U.S. PATENT DOCUMENTS

| 2009/0225407 | A1 | 9/2009 | Nakayama et al. | |
| 2014/0367590 | A1 | 12/2014 | Walla | |
| 2019/0302023 | A1* | 10/2019 | Mizokuchi | G02F 1/13 |
| 2021/0063310 | A1* | 3/2021 | Shirokawa | G01N 21/6445 |
| 2021/0191098 | A1 | 6/2021 | Shim et al. | |
| 2022/0034876 | A1* | 2/2022 | Mizokuchi | G01N 21/6456 |

OTHER PUBLICATIONS

John F. Lesoine; "Quantitative scheme for full-field polarization rotating fluorescence microscopy using a liquid crystal variable Retarder", 2012 (Year: 2012).*

* cited by examiner

Y

ALIGNMENT DIRECTION

LIQUID CRYSTAL
MOLECULE

POSITION

X

OPTICAL AXIS OF POLARIZATION
DIRECTION ADJUSTMENT ELEMENT

Y

OPTICAL AXIS

POSITION

X

COMPONENT HAVING
IDENTICAL FREQUENCY

DIRECT CURRENT
COMPONENT

POLARIZATION
DIRECTION:X

POLARIZATION
DIRECTION:Y

FIG.12

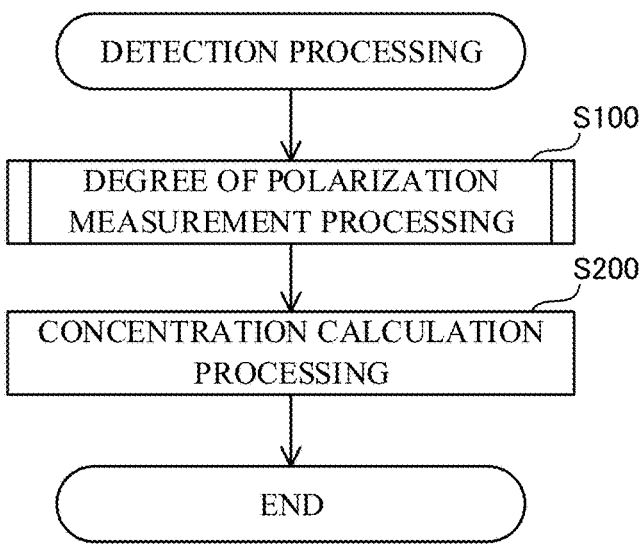

DETECTION PROCESSING

S100

DEGREE OF POLARIZATION
MEASUREMENT PROCESSING

S200

CONCENTRATION CALCULATION
PROCESSING

END

FIG.13

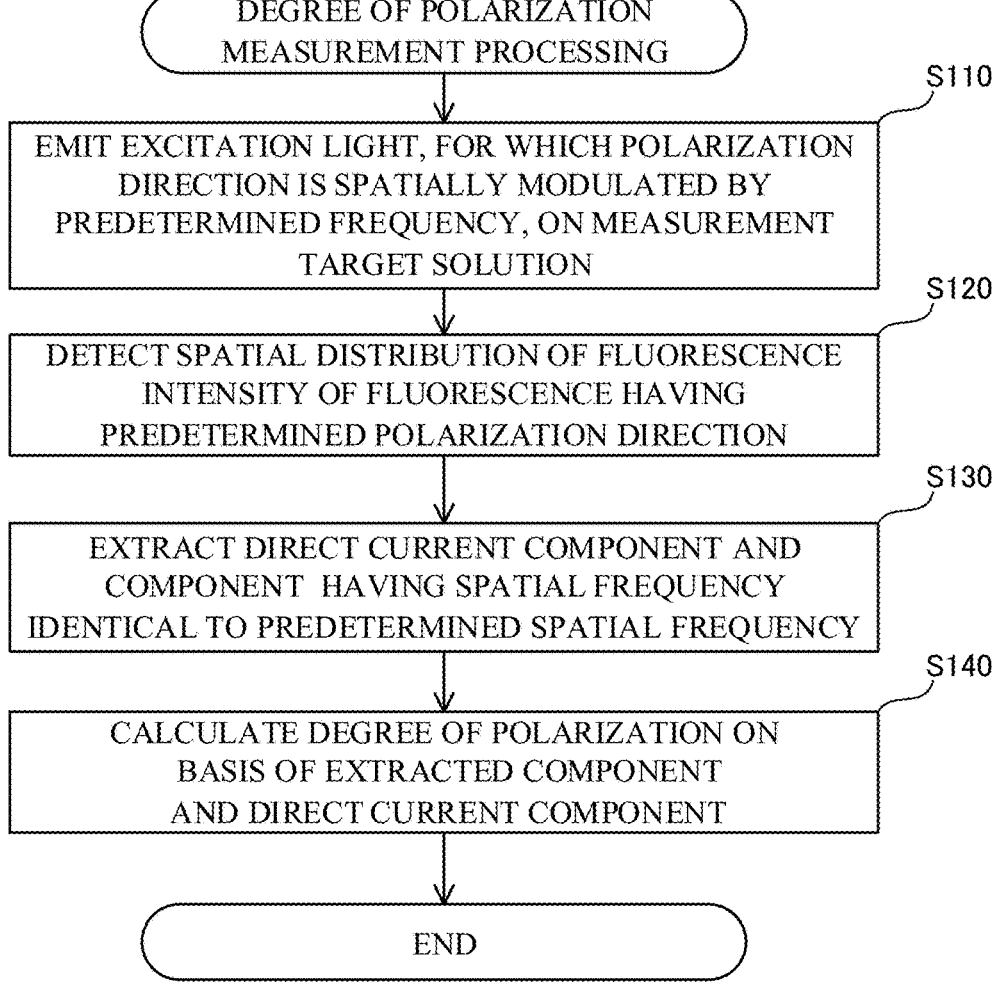

DEGREE OF POLARIZATION
MEASUREMENT PROCESSING

S110

EMIT EXCITATION LIGHT, FOR WHICH POLARIZATION
DIRECTION IS SPATIALLY MODULATED BY
PREDETERMINED FREQUENCY, ON MEASUREMENT
TARGET SOLUTION

S120

DETECT SPATIAL DISTRIBUTION OF FLUORESCENCE
INTENSITY OF FLUORESCENCE HAVING
PREDETERMINED POLARIZATION DIRECTION

S130

EXTRACT DIRECT CURRENT COMPONENT AND
COMPONENT HAVING SPATIAL FREQUENCY
IDENTICAL TO PREDETERMINED SPATIAL FREQUENCY

S140

CALCULATE DEGREE OF POLARIZATION ON
BASIS OF EXTRACTED COMPONENT
AND DIRECT CURRENT COMPONENT

END

FIG.16

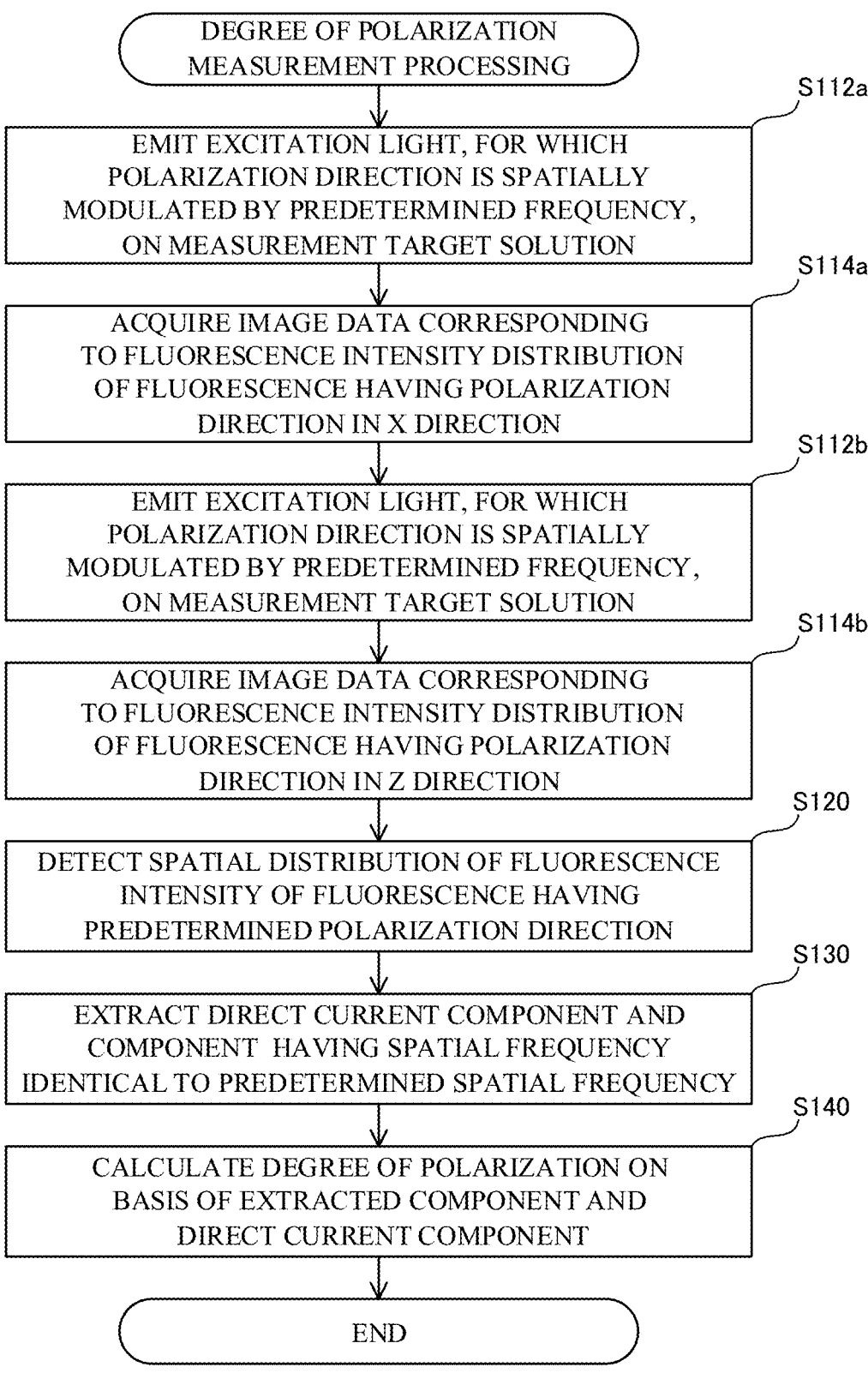

DEGREE OF POLARIZATION
MEASUREMENT PROCESSING

S112a

EMIT EXCITATION LIGHT, FOR WHICH
POLARIZATION DIRECTION IS SPATIALLY
MODULATED BY PREDETERMINED FREQUENCY,
ON MEASUREMENT TARGET SOLUTION

S114a

ACQUIRE IMAGE DATA CORRESPONDING
TO FLUORESCENCE INTENSITY DISTRIBUTION
OF FLUORESCENCE HAVING POLARIZATION
DIRECTION IN X DIRECTION

S112b

EMIT EXCITATION LIGHT, FOR WHICH
POLARIZATION DIRECTION IS SPATIALLY
MODULATED BY PREDETERMINED FREQUENCY,
ON MEASUREMENT TARGET SOLUTION

S114b

ACQUIRE IMAGE DATA CORRESPONDING
TO FLUORESCENCE INTENSITY DISTRIBUTION
OF FLUORESCENCE HAVING POLARIZATION
DIRECTION IN Z DIRECTION

S120

DETECT SPATIAL DISTRIBUTION OF FLUORESCENCE
INTENSITY OF FLUORESCENCE HAVING
PREDETERMINED POLARIZATION DIRECTION

S130

EXTRACT DIRECT CURRENT COMPONENT AND
COMPONENT HAVING SPATIAL FREQUENCY
IDENTICAL TO PREDETERMINED SPATIAL FREQUENCY

S140

CALCULATE DEGREE OF POLARIZATION ON
BASIS OF EXTRACTED COMPONENT AND
DIRECT CURRENT COMPONENT

END

FLUORESCENCE POLARIZATION MEASUREMENT DEVICE, AND DEGREE OF POLARIZATION MEASUREMENT METHOD

CROSS-REFERENCE TO RELATED APPLICATIONS

This application claims the benefit of Japanese Patent Application No. 2023-136206, filed on Aug. 24, 2023, the entirety of the disclosure of which is incorporated by reference herein.

FIELD OF THE INVENTION

The present application relates generally to a fluorescence polarization measurement device and a degree of polarization measurement method.

BACKGROUND OF THE INVENTION

Among immunoassay methods that use fluorescence, fluorescence polarization immunoassay (FPIA) methods that use antigen-antibody reactions to detect a measurement target substance to be measured are known. For example, Japanese Patent Application Publication No. H03-103765 describes a method for calculating the concentration of a measurement antigen (measurement target substance) from the measured degree of polarization of fluorescence.

Additionally, U.S. Pat. No. 6,970,241 describes a fluorescence measurement device that includes modulation means that periodically (temporally) rotate, 90°, a polarization plane of fluorescence emitted from a sample. In U.S. Pat. No. 6,970,241, the modulation means rotate the polarization plane of the fluorescence and, as such, it is possible to measure, without rotating the polarizer, the fluorescence intensity of fluorescence having a polarization direction parallel to the polarization direction of the excitation light and the fluorescence intensity of fluorescence having a polarization direction perpendicular to the polarization direction of the excitation light. Due to this, the fluorescence measurement device of U.S. Pat. No. 6,970,241 suppresses the influence of the polarization characteristics of a detector, a filter, and the like.

With the fluorescence measurement device of U.S. Pat. No. 6,970,241, it is possible to suppresses the influence of the polarization characteristics of a detector, a filter, and the like but, when the fluorescence intensity is low, it is difficult to obtain fluorescence intensity at a sufficient signal-to-noise ratio (SN ratio).

SUMMARY OF THE INVENTION

A fluorescence polarization measurement device according to a first aspect of the present disclosure includes:
- a light source unit that emits excitation light that is linearly polarized;
- a polarization direction modulation element that spatially modulates a polarization direction of the excitation light by a predetermined frequency, and emits, on a measurement target solution, the excitation light for which the polarization direction is spatially modulated by the predetermined frequency;
- a detector that detects a spatial distribution of fluorescence intensity of the fluorescence having a polarization direction in a predetermined direction from among fluorescence emitted from the measurement target solution due to the excitation light for which the polarization direction is spatially modulated by the predetermined frequency; and
- a controller that extracts, from the detected spatial distribution of fluorescence intensity, a direct current component and a component having a frequency identical to the predetermined frequency, and calculates, based on the extracted component and the direct current component, a degree of polarization of the measurement target solution.

A degree of polarization measurement method according to a second aspect of the present disclosure includes:
- emitting, on a measurement target solution, excitation light for which a polarization direction has been spatially modulated by a predetermined frequency;
- detecting, from among fluorescence emitted from the measurement target solution, a spatial distribution of fluorescence intensity of the fluorescence having a polarization direction in a predetermined direction;
- extracting, from the detected spatial distribution of fluorescence intensity, a direct current component and a component having a frequency identical to the predetermined frequency; and
- calculating, based on the extracted component and the direct current component, a degree of polarization of the measurement target solution.

It is to be understood that both the foregoing general description and the following detailed description are exemplary and explanatory and are not restrictive of this disclosure.

BRIEF DESCRIPTION OF DRAWINGS

A more complete understanding of this application can be obtained when the following detailed description is considered in conjunction with the following drawings, in which:

FIG. 12 is a flowchart illustrating detection processing according to Embodiment 1;

FIG. 13 is a flowchart illustrating degree of polarization measurement processing according to Embodiment 1;

FIG. 16 is a flowchart illustrating degree of polarization measurement processing according to Embodiment 2;

DETAILED DESCRIPTION OF THE INVENTION

Hereinafter, a fluorescence polarization measurement device according to various embodiments is described while referencing the drawings.

Embodiment 1

Firstly, a fluorescence polarization measurement device 100 according to the present embodiment is described while referencing FIGS. 1 to 12. In one example, the fluorescence polarization measurement device 100 is used in detection, using a fluorescence polarization immunoassay method, of a measurement target substance to be measured contained in measurement target solution to be measured.

Figure 1:
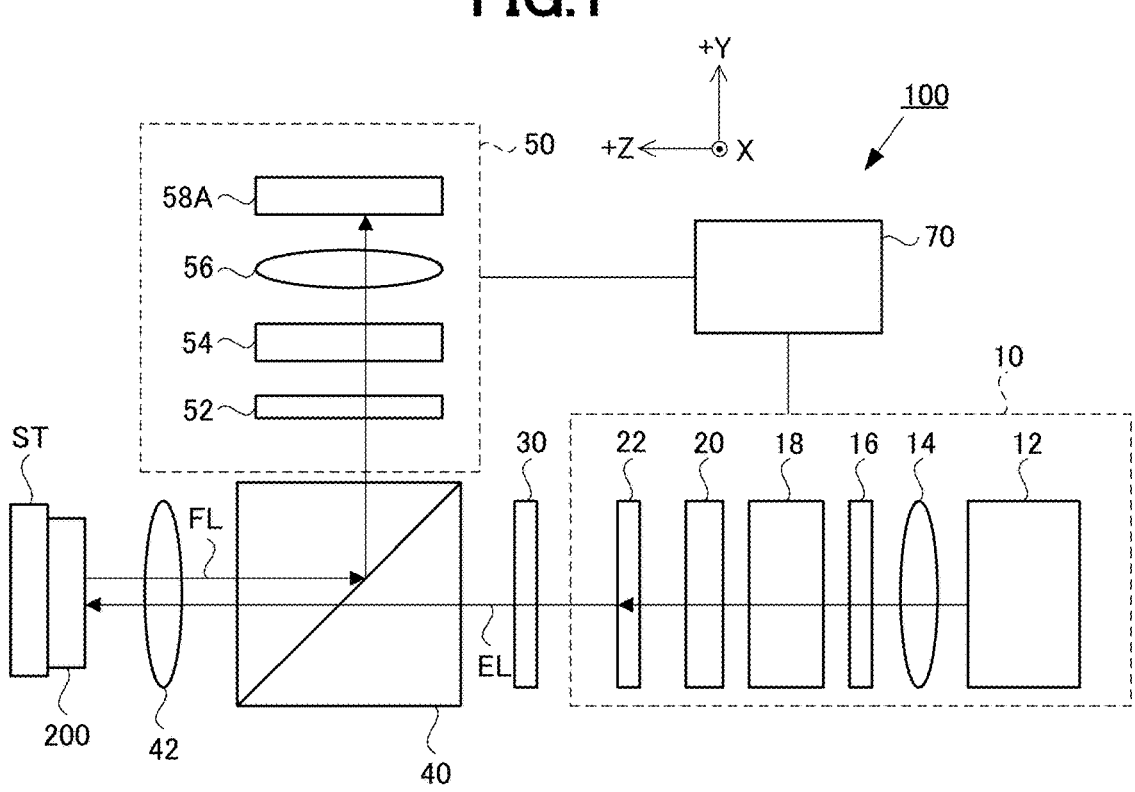
FIG. 1 is a schematic drawing illustrating a fluorescence polarization measurement device according to Embodiment 1.

As illustrated in FIG. 1, the fluorescence polarization measurement device 100 includes a light source unit 10, a polarization direction modulation element 30, a dichroic mirror 40, an objective lens 42, a detector 50, and a controller 70. The light source unit 10 emits excitation light EL that is linearly polarized. The polarization direction modulation element 30 spatially modulates, by a predetermined frequency, the polarization direction of the excitation light EL emitted from the light source unit 10 The excitation light EL for which the polarization direction is spatially modulated by the predetermined frequency is emitted, through the dichroic mirror 40 and the objective lens 42, on a measurement target solution that is introduced to microchannels 220 of a microdevice 200, described later. The detector 50 detects, from among fluorescence FL emitted from the measurement target solution, a spatial distribution of fluorescence intensity of the fluorescence FL that has the polarization direction in a predetermined direction. The controller 70 controls the various constituents of the fluorescence polarization measurement device 100. Additionally, the controller 70 calculates, from the detected spatial distribution of fluorescence intensity, a degree of polarization P of the measurement target solution. Furthermore, the controller 70 calculates, from the degree of polarization P of the measurement target solution, a concentration of the measurement target substance.

Note that, in the present description, to facilitate comprehension, in the fluorescence polarization measurement device 100 of FIG. 1, the left direction (the left direction on paper) is referred to as the "+Z direction", the up direction (the up direction on paper) is referred to as the "+Y direction", and the direction perpendicular to the +Y direction and the +Z direction (the front direction on paper) is referred to as the "+X direction." The excitation light EL is light that excites a fluorescence-labeled derivative, described later, and that causes the fluorescence-labeled derivative to emit fluorescence. The light source unit 10, the polarization direction modulation element 30, the dichroic mirror 40, and the objective lens 42 form a lighting optical system, and the objective lens 42, the dichroic mirror 40, and the detector 50 form an observation optical system.

Firstly, the measurement target solution and the microdevice 200 are described. The measurement target solution includes a measurement target substance, a fluorescence-labeled derivative, and an antibody. The measurement target substance to be measured is the detection target of the fluorescence polarization measurement device 100. The measurement target substance to be measured may be any compound detectable in a fluorescence immunoassay. Examples of the measurement target substance include antibiotics, bioactive substances, mycotoxins, and the like. Specific examples of the measurement target substance include prostaglandin E2, β-lactoglobulin, chloramphenicol, deoxynivalenol, and the like. The fluorescence-labeled derivative is a derivative obtained by fluorescently labeling the measurement target substance with a fluorescent substance. The fluorescence-labeled derivative can be obtained by using a known method to bind the fluorescent substance to the measurement target substance. The fluorescent substance is fluorescein (wavelength of excitation light EL: 494 nm, wavelength of fluorescence FL: 521 nm), rhodamine B (wavelength of excitation light EL: 550 nm, wavelength of fluorescence FL: 580 nm), or the like. The antibody binds specifically to the measurement target substance due to an antigen-antibody reaction. In one example, the antibody is obtained by inoculating a host animal (for example, a mouse or a cow) with the measurement target substance, and collecting and purifying the antibodies in the blood produced by the host animal. Alternatively, a commercially available antibody can be used as the antibody.

The measurement target substance and the fluorescence-labeled derivative compete and bind specifically to the antibody due to the antigen-antibody reaction. In fluorescence polarization immunoassays, the degree of polarization P of the fluorescence FL emitted by the fluorescence-labeled derivative included in the measurement target solution is calculated. Additionally, the concentration of the measurement target substance is calculated from the obtained degree of polarization P and a calibration curve that is created in advance.

Figure 2:
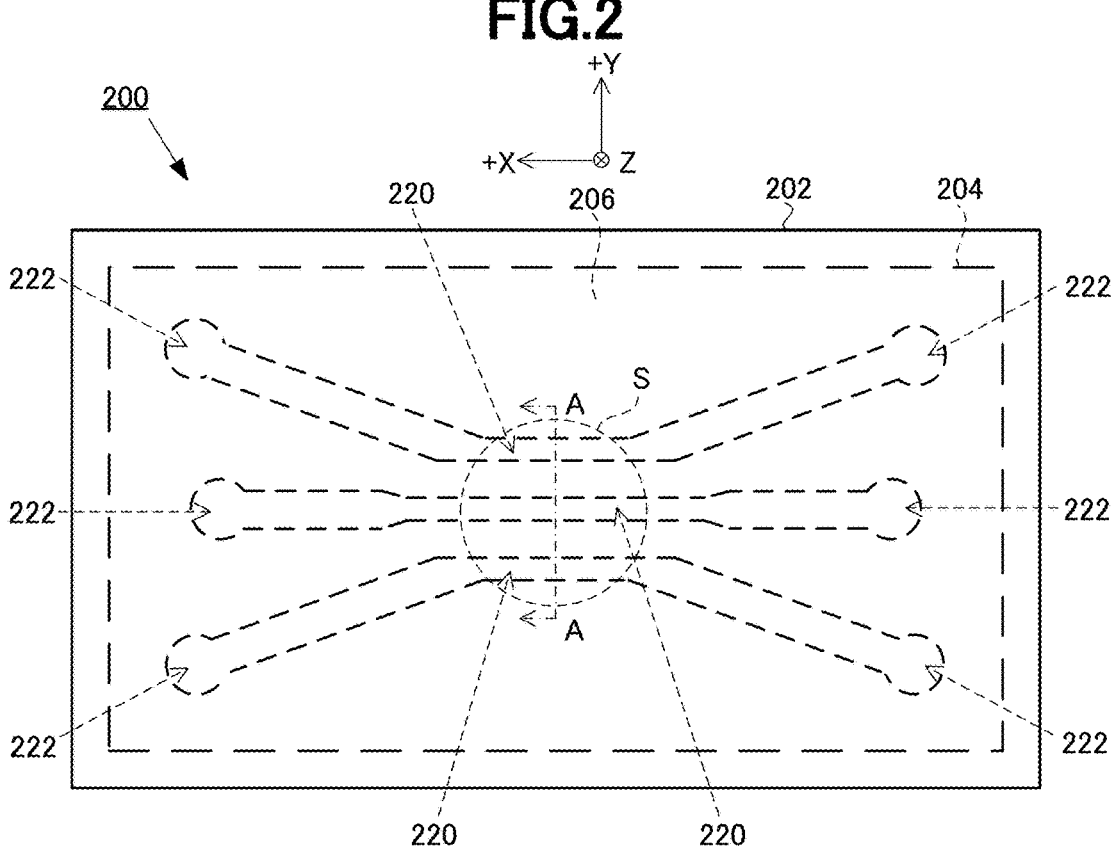
FIG. 2 is a plan view illustrating a microdevice according to Embodiment 1.
Figure 3:
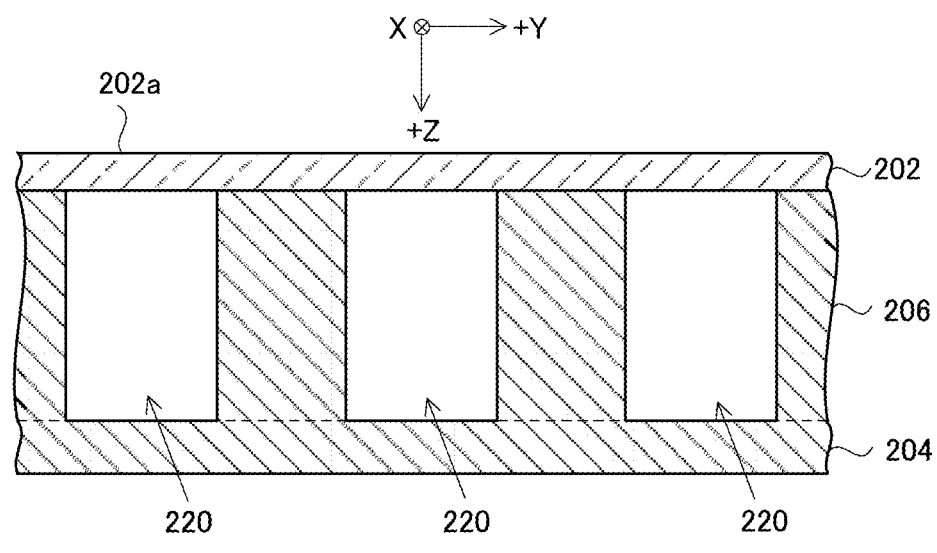
FIG. 3 is a cross-sectional view of the microdevice illustrated in FIG. 2, taken along line A-A.

The fluorescence-labeled derivative not bound to the antibody moves vigorously in the measurement target solution and, as such, when the fluorescence-labeled derivative not bound to the antibody is irradiated with the polarized excitation light EL, fluorescence FL is randomly emitted. Meanwhile, movement in the measurement target solution of the fluorescence-labeled derivative bound to the antibody is limited and, as such, when the fluorescence-labeled derivative bound to the antibody is irradiated with the polarized excitation light EL, fluorescence FL biased in the polarization direction of the excitation light EL is emitted. A fluorescence intensity Ih of the fluorescence FL having a polarization direction parallel to the polarization direction of the excitation light EL and a fluorescence intensity Iv of the fluorescence FL having a polarization direction perpendicular to the polarization direction of the excitation light EL are measured, and the bias of the fluorescence intensity is calculated as the degree of polarization P. The degree of polarization P is dependent on the amount of the fluorescence-labeled derivative bound to the antibody and, as such, the concentration of the measurement target substance can be calculated from the obtained degree of polarization P and the calibration curve that is created in advance. Note that the degree of polarization P is expressed as $P=(Ih-Iv)/(Ih+Iv)$ As illustrated in FIGS. 2 and 3, the microdevice 200 includes a first substrate 202, a second substrate 204, a partition wall 206, and three microchannels 220. The measurement target solution is introduced into each of the microchannels 220. The microdevice 200 is placed on a stage ST of the fluorescence polarization measurement device 100.

The first substrate 202 of the microdevice 200 is implemented as a flat plate-like quartz glass substrate. The excitation light EL for which the polarization direction is spatially modulated by the predetermined frequency enters the microdevice 200 through the first substrate 202. The excitation light EL is emitted, from the −Z direction, on a measurement region S illustrated in FIG. 2. The excitation light EL perpendicularly enters a main surface 202a of the first substrate 202.

The second substrate 204 of the microdevice 200 is implemented as a flat plate-like substrate. The second substrate 204 is formed from a material that has little autofluorescence. In one example, the second substrate 204 is formed from carbon black-containing polydimethylsiloxane (PDMS). The second substrate 204 faces the first substrate 202, and the second substrate 204 and the first substrate 202 sandwich the partition wall 206.

The partition wall 206 of the microdevice 200 is sandwiched by the first substrate 202 and the second substrate 204 to form the microchannels 220. The partition wall 206 is formed from a material that has little autofluorescence. Additionally, it is preferable that the partition wall 206 is formed from a material that absorbs light such as the excitation light EL, the fluorescence FL, and the like. In the present embodiment, the partition wall 206 is formed integrally with the second substrate 204.

The microchannels 220 of the microdevice 200 extend parallel to the X direction in the measurement region S. In one example, a width of each of the microchannels 220 in the measurement region S is 200 m. Each of the microchannels 220 includes two openings 222 that penetrate the second substrate 204 and the partition wall 206. The measurement target solution is introduced and discharged through the openings 222.

Next, the various constituents of the fluorescence polarization measurement device 100 are described. As illustrated in FIG. 1, the light source unit 10 of the fluorescence polarization measurement device 100 includes a light source 12, a condenser lens 14, an iris 16, a collimator 18, a first polarization adjustment element 20, and an excitation light filter 22.

The light source 12 emits, in the +Z direction, light including the excitation light EL. In one example, the light source 12 is constituted by a light emitting diode (LED) device. Light emitted from the light source 12 is focused by the condenser lens 14 and, then, passes through the iris 16. The iris 16 reduces the influence of external light (light other than the light emitted from the light source 12). The light that has passed through the iris 16 enters the collimator 18.

The collimator 18 converts the entering light to parallel light. The light that is converted to parallel light enters the first polarization adjustment element 20.

The first polarization adjustment element 20 selects, from among the entering light, light having the polarization direction in a predetermined direction, and emits light having the polarization direction in the predetermined direction. The light emitted from the first polarization adjustment element 20 enters the excitation light filter 22. In the present embodiment, the predetermined direction in the first polarization adjustment element 20 is the X direction, and the first polarization adjustment element 20 is a polarizing plate. Specifically, the light, including the excitation light EL, that enters the first polarization adjustment element 20 is emitted as linear polarized light having the polarization direction in the X direction, and enters the excitation light filter 22. The excitation light filter 22 removes, from the light emitted from the light source 12, light other than the excitation light EL. In one example, the excitation light filter 22 is implemented as a bandpass filter.

Accordingly, excitation light EL having the polarization direction in the X direction is emitted from the light source unit 10 in the +Z direction. The excitation light EL having the polarization direction in the X direction enters the polarization direction modulation element 30.

Figure 4:
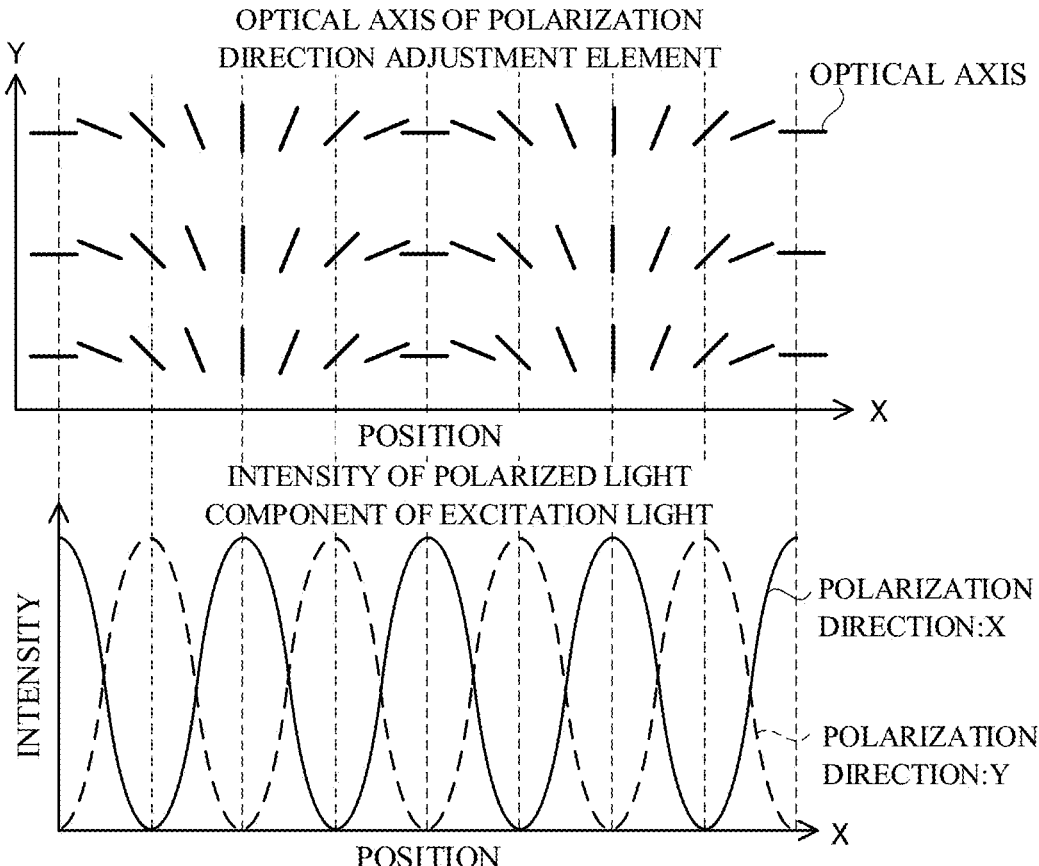
FIG. 4 is a drawing illustrating an optical axis of a polarization direction modulation element and an intensity of a polarized light component of excitation light, according to Embodiment 1.

The polarization direction modulation element 30 of the fluorescence polarization measurement device 100 spatially modulates, along the X direction, the polarization direction of the excitation light EL having the polarization direction in the X direction by the predetermined frequency (predetermined period). In one example, the polarization direction modulation element 30 is a half wave plate for which the optical axis changes continuously along the X direction. In the polarization direction modulation element (the half wave plate) 30 of the present embodiment, as illustrated in FIG. 4, the optical axis continuously rotates 180° along the X direction from the −X direction to the +X direction. Due to this, the polarization direction of the excitation light EL continuously rotates along the X direction from the X direction. Accordingly, as illustrated in FIG. 4, intensities of the component having the polarization direction in the X direction and the component having the polarization direction in the Y direction in the excitation light EL emitted from the polarization direction modulation element 30 periodically increase and decrease at a frequency identical to the predetermined frequency whereby the polarization direction modulation element 30 modulates the polarization direction. The intensities of the component having the polarization direction in the X direction and the component having the polarization direction in the Y direction are reversed (have reversed phases). The polarization direction modulation element 30 emits the spatially modulated excitation light EL on the dichroic mirror 40.

Figures 5, 6:
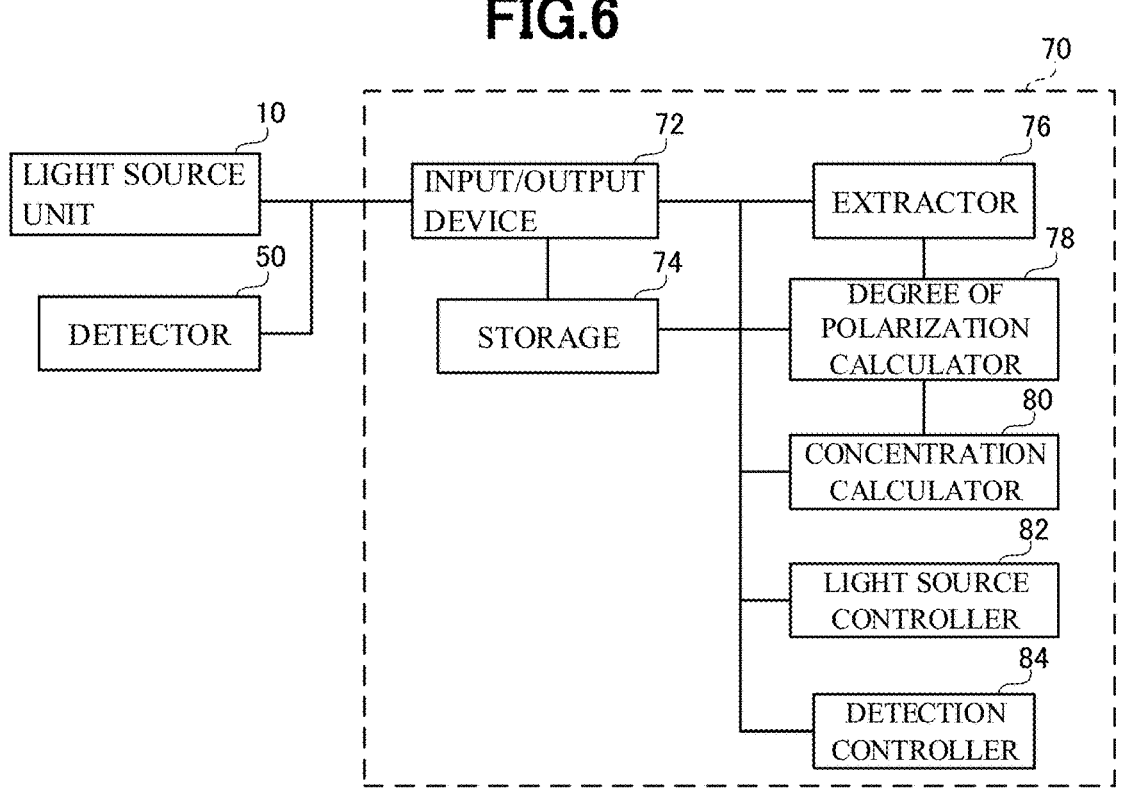
FIG. 5 is a drawing illustrating an alignment direction of liquid crystal molecules and the optical axis of the polarization direction modulation element, according to Embodiment 1.
FIG. 6 is a block diagram illustrating the configuration of a controller according to Embodiment 1.

In one example, the polarization direction modulation element 30 is formed from a liquid crystal cell in which nematic liquid crystal is homogeneously arranged. In this liquid crystal cell, the alignment direction of the liquid crystal molecules continuously rotates 1800 along the X direction, as illustrated in FIG. 5. Additionally, a retardation value of the liquid crystal cell is ½ the wavelength of the excitation light EL.

Returning to FIG. 1, the dichroic mirror 40 of the fluorescence polarization measurement device 100 transmits the spatially modulated excitation light EL in the +Z direction. Additionally, the dichroic mirror 40 reflects the fluorescence FL emitted from the microdevice 200 toward the detector 50 (in the +Y direction). The objective lens 42 of the fluorescence polarization measurement device 100 focuses the fluorescence FL and the excitation light EL that passes through the dichroic mirror 40.

The excitation light EL that is spatially modulated by the polarization direction modulation element 30 is emitted through the dichroic mirror 40 and the objective lens 42, and on the measurement region S of the microdevice 200. As a result, the fluorescence FL is emitted from the measurement target solution (the fluorescence-labeled derivative) introduced into the microchannels 220 of the microdevice 200. The fluorescence FL travels in the +Y direction through the objective lens 42 and the dichroic mirror 40, and enters the detector 50 (an absorption filter 52, described later).

The detector 50 of the fluorescence polarization measurement device 100 is disposed on the +Y side of the dichroic mirror 40. The detector 50 includes the absorption filter 52, a second polarization adjustment element 54, an imaging lens 56, and a first light receiver 58A.

The absorption filter 52 separates the fluorescence FL emitted from the microdevice 200 from scattered light, leaked light, and the like, and transmits the fluorescence FL. In one example, the absorption filter 52 is implemented as a bandpass filter. The fluorescence FL emitted from the absorption filter 52 enters the second polarization adjustment element 54.

The second polarization adjustment element 54 selects, from among the entering fluorescence FL, the fluorescence FL having the polarization direction in the predetermined direction, and emits the fluorescence FL having the polarization direction in the predetermined direction. In the present embodiment, the predetermined direction in the second polarization adjustment element 54 is the X direction, and the second polarization adjustment element 54 is a polarizing plate. Accordingly, the fluorescence FL having the polarization direction in the X direction is emitted from the second polarization adjustment element 54. The fluorescence FL having the polarization direction in the X direction enters the first light receiver 58A through the imaging lens 56.

In one example, the first light receiver 58A is implemented as a charge coupled device (CCD) image sensor. The first light receiver 58A detects, as an image, a spatial distribution of fluorescence intensity of the fluorescence FL having the predetermined polarization direction (the polarization direction in the X direction). The first light receiver 58A generates image data corresponding to the spatial distribution of fluorescence intensity of the fluorescence FL. Additionally, the first light receiver 58A sends the image data to the controller 70. Note that the main surface 202a of the first substrate 202 of the microdevice 200 and an imaging surface of the first light receiver 58A have an image-forming relationship.

The controller 70 of the fluorescence polarization measurement device 100 extracts, from the spatial distribution of fluorescence intensity of the fluorescence FL having the predetermined polarization direction (the polarization direction in the X direction), a direct current component and a component having a frequency identical to the predetermined frequency whereby the polarization direction modulation element 30 spatially modulates, along the X direction, the polarization direction of the excitation light EL having the polarization direction in the X direction. The controller 70 calculates the degree of polarization P of the measurement target solution on the basis of the extracted direct current component and the component having the identical frequency. Furthermore, the controller 70 calculates the concentration of the measurement target substance from the degree of polarization P and the calibration curve. As illustrated in FIG. 6, the controller 70 includes an input/output device 72, a storage 74, an extractor 76, a degree of polarization calculator 78, and a concentration calculator 80. The controller 70 further includes a light source controller 82 and a detection controller 84. Note that, in the following, the predetermined frequency, whereby the polarization direction modulation element 30 spatially modulates the polarization direction of the excitation light EL having the polarization direction in the X direction, is referred to as the spatial frequency of the polarization direction modulation element 30.

The input/output device 72 inputs/outputs signals, data, and the like between the controller 70 and the various components.

The storage 74 stores programs, image data corresponding to the spatial distribution of fluorescence intensity of the fluorescence FL, data expressing a calibration curve of the degree of polarization P and the concentration of the measurement target substance, and the like.

The extractor 76 obtains the spatial distribution of fluorescence intensity of the fluorescence FL from image data corresponding to the spatial distribution of fluorescence intensity of the fluorescence FL. Furthermore, the extractor 76 extracts, from the obtained spatial distribution of fluorescence intensity of the fluorescence FL, the direct current component and the component having the frequency identical to the spatial frequency of the polarization direction modulation element 30.

Next, the spatial distribution of fluorescence intensity of the fluorescence FL obtained from the image data, and the component having the frequency identical to the spatial frequency of the polarization direction modulation element 30 are described.

Figure 7:
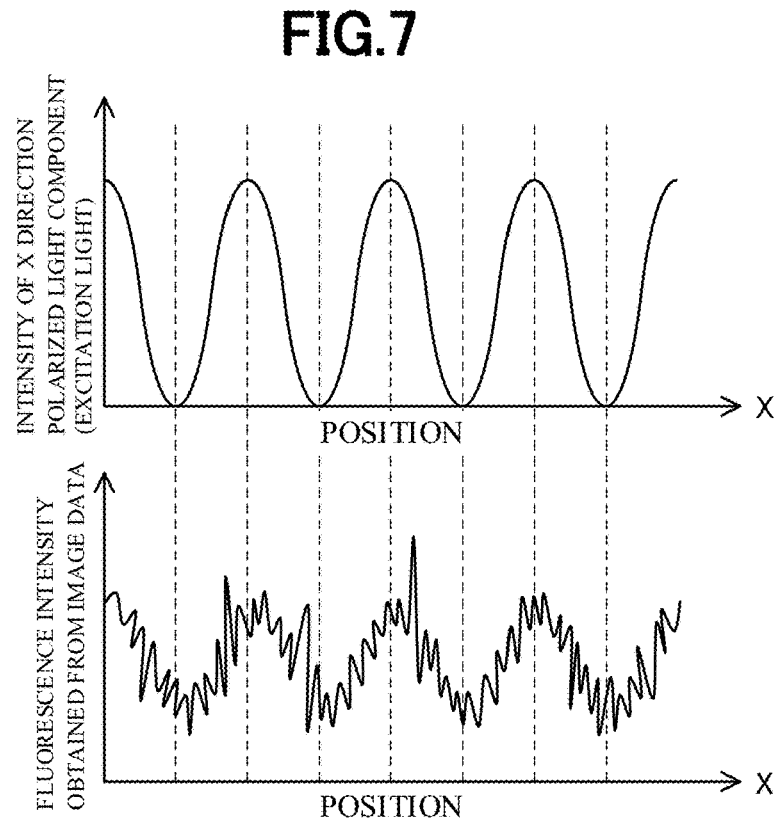
FIG. 7 is a drawing illustrating a fluorescence intensity calculated from image data according to Embodiment 1.

In the present embodiment, the excitation light EL spatially modulated by the polarization direction modulation element 30 is emitted on the measurement target solution (the microdevice 200). As illustrated in FIG. 4, the excitation light EL spatially modulated by the polarization direction modulation element 30 includes a component having the polarization direction in the X direction and a component having the polarization direction in the Y direction for which intensities thereof increase and decrease periodically at a frequency identical to the spatial frequency of the polarization direction modulation element 30. The detector 50 detects, as an image, the spatial distribution of fluorescence intensity of the fluorescence FL having the polarization direction in the X direction. Accordingly, the spatial distribution of fluorescence intensity of the fluorescence FL obtained from the image data has periodicity identical to the intensity of the component having the polarization direction in the X direction of the excitation light EL. However, when the concentration of the measurement target substance is low, the spatial distribution of fluorescence intensity of the fluorescence FL obtained from the image data becomes, as illustrated in FIG. 7, a spatial distribution that includes a large amount of noise caused by stray light, vibration, variations in the sensitivity of the light receiver, and the like. It is difficult to calculate the degree of polarization P directly from this sort of spatial distribution of fluorescence intensity that includes a large amount of noise.

As such, the extractor 76 extracts, from the obtained spatial distribution of fluorescence intensity of the fluorescence FL, the direct current component and the component having the frequency identical to the spatial frequency of the polarization direction modulation element 30. The spatial frequency of the noise included in the obtained spatial distribution of fluorescence intensity of the fluorescence FL and the spatial frequency of the polarization direction modulation element 30 are different and, as such, the SN ratio of the fluorescence intensity of the fluorescence FL can be enhanced by extracting the component having the frequency identical to the spatial frequency of the polarization direction modulation element 30 from the obtained spatial distribution of fluorescence intensity of the fluorescence FL. Note that, the phrase "extracts the component having the frequency identical to the spatial frequency of the polarization direction modulation element 30" can also be expressed as "obtains a function that expresses the component having the frequency identical to the spatial frequency of the polarization direction modulation element 30."

Figure 8:
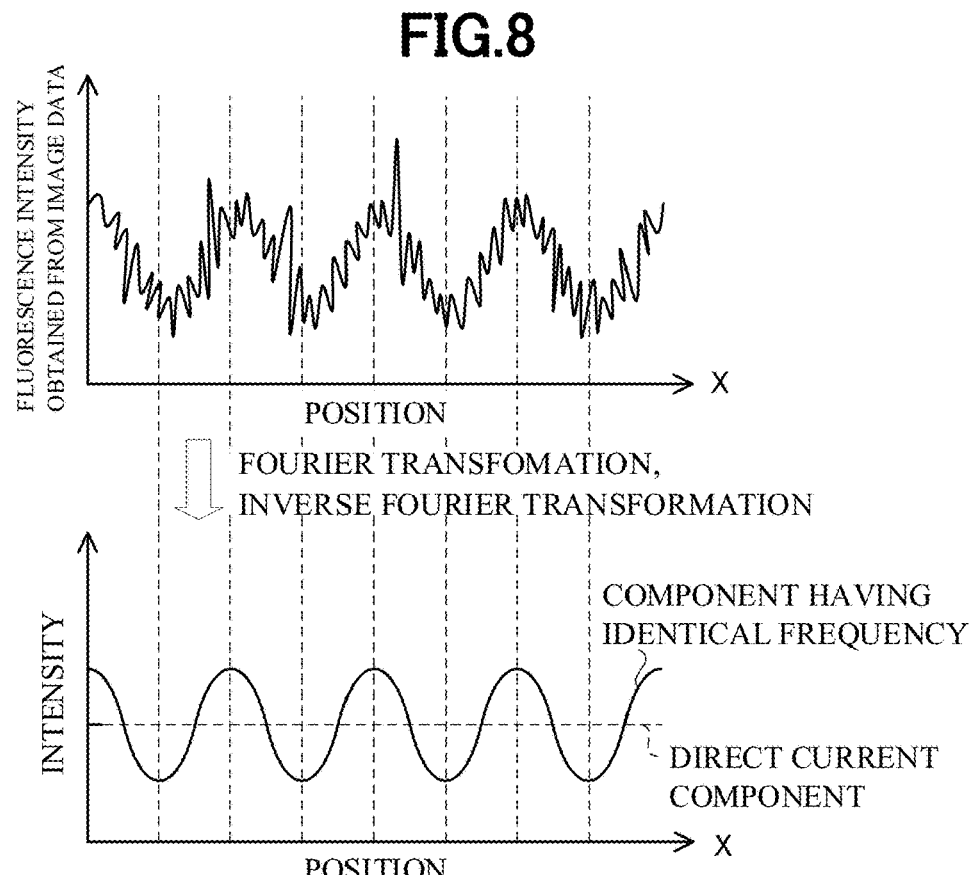
FIG. 8 is a drawing illustrating a direct current component and a component having a frequency identical to a spatial frequency of the polarization direction modulation element, according to Embodiment 1.

Specifically, the extractor 76 performs Fourier transformation using the spatial frequency of the polarization direction modulation element 30 on the spatial distribution of fluorescence intensity of the fluorescence FL obtained from the image data. Next, the extractor 76 performs inverse Fourier transformation to, as illustrated in FIG. 8, obtain the direct current component (DC offset) and the component having the frequency identical to the spatial frequency of the polarization direction modulation element 30.

Figure 9:
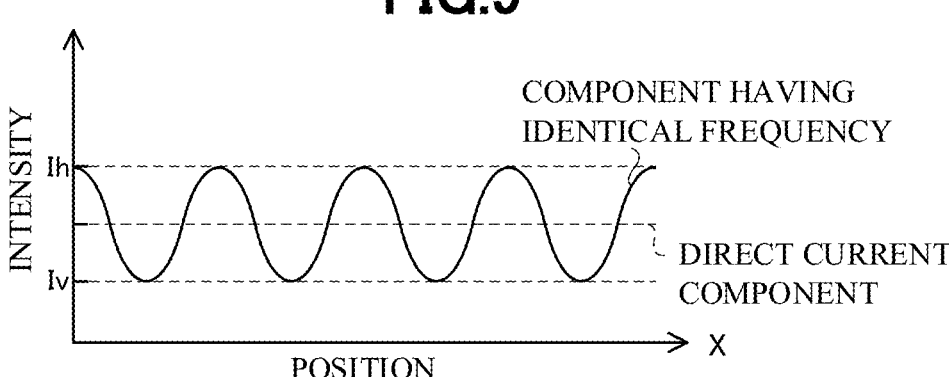
FIG. 9 is a drawing for explaining a fluorescence intensity of fluorescence that has a polarization direction parallel to the polarization direction of the excitation light, and a fluorescence intensity of fluorescence that has a polarization direction perpendicular to the polarization direction of the excitation light, according to Embodiment 1.

The degree of polarization calculator 78 calculates the degree of polarization P from the direct current component and the component having the frequency identical to the spatial frequency of the polarization direction modulation element 30, obtained by the extractor 76. As described above, the intensities, of the component having the polarization direction in the X direction and the component having the polarization direction in the Y direction of the excitation light EL emitted on the measurement target solution, have a reversed phase relationship. Additionally, the detector 50 detects the spatial distribution of fluorescence intensity of the fluorescence FL having the polarization direction in the X direction. Accordingly, as illustrated in FIG. 9, a maximum value of the component (including the direct current component) having the frequency identical to the spatial frequency of the polarization direction modulation element 30 corresponds to the fluorescence intensity Ih of the fluorescence FL having the polarization direction parallel to the polarization direction of the excitation light EL. Additionally, a minimum value of the component (including the direct current component) having the frequency identical to the spatial frequency of the polarization direction modulation element 30 corresponds to the fluorescence intensity Iv of the fluorescence FL having the polarization direction perpendicular to the polarization direction of the excitation light EL. Accordingly, the degree of polarization calculator 78 calculates the degree of polarization P from the maximum value and the minimum value of the component having the frequency identical to the spatial frequency of the polarization direction modulation element 30. The SN ratio of the fluorescence intensity of the fluorescence FL is high and, as such, the fluorescence polarization measurement device 100 can detect the degree of polarization P with high measurement sensitivity.

The concentration calculator 80 calculates the concentration of the measurement target substance from the degree of polarization P calculated by the degree of polarization calculator 78 and the calibration curve of the degree of polarization P and the concentration of the measurement target substance.

The light source controller 82 controls the light source unit 10 (the light source 12). The detection controller 84 controls the detector 50 (the first light receiver 58A).

Figure 10:
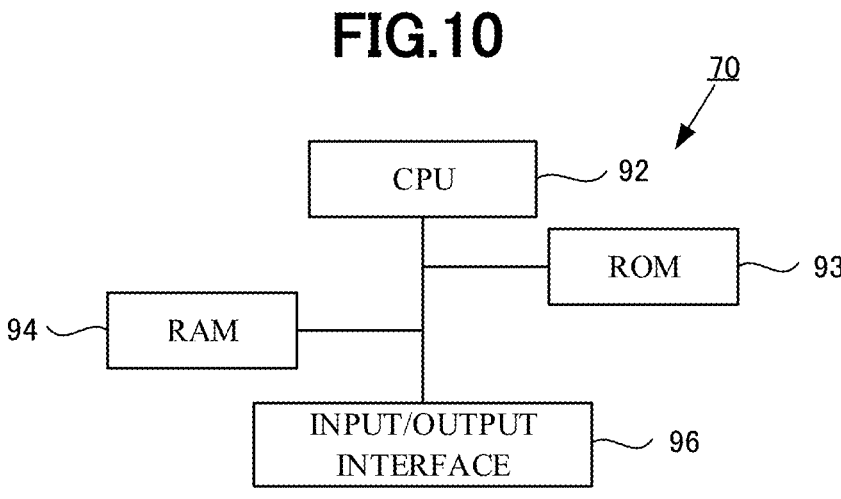
FIG. 10 is a drawing illustrating the hardware configuration of the controller according to Embodiment 1.

FIG. 10 illustrates the hardware configuration of the controller 70. The controller 70 includes a central processing unit (CPU) 92, a read-only memory (ROM) 93, a random access memory (RAM) 94, an input/output interface 96. The CPU 92 executes programs stored in the ROM 93. The ROM 93 stores programs, data, and the like. The RAM 94 stores data. The input/output interface 96 inputs and outputs signals, data, and the like between the various components. The functions of the controller 70 are realized by the execution of the programs by the CPU 92.

Figure 11:
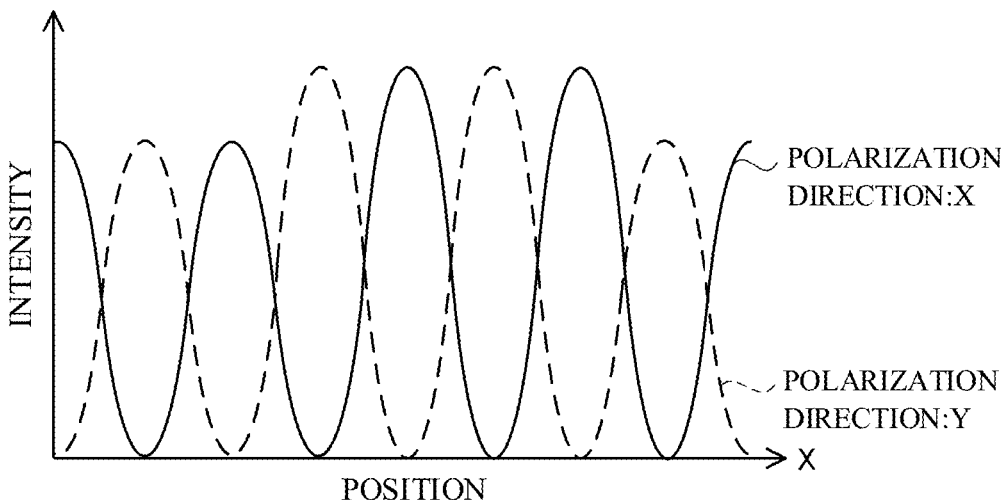
FIG. 11 is a drawing for explaining an intensity distribution of the excitation light according to Embodiment 1.

As described above, the component having the frequency identical to the spatial frequency of the polarization direction modulation element 30 is extracted from the obtained spatial distribution of fluorescence intensity of the fluorescence FL and, as such, the fluorescence polarization measurement device 100 can suppress the influence of noise and enhance the measurement sensitivity of the degree of polarization P of the fluorescence polarization measurement device 100. Furthermore, even in a case such as illustrated in FIG. 11 in which the intensity of the excitation light EL emitted on the measurement target solution is non-uniform, the fluorescence polarization measurement device 100 can suppress the influence of the intensity distribution of the excitation light EL and can calculate the degree of polarization P. Additionally, the measurement sensitivity of the degree of polarization P is high and, as such, the fluorescence polarization measurement device 100 can accurately detect the measurement target substance even when the concentration of the measurement target substance is low.

Furthermore, the maximum value of the component having the frequency identical to the spatial frequency of the polarization direction modulation element 30 corresponds to the fluorescence intensity Ih, and the minimum value of the component having the frequency identical to the spatial frequency of the polarization direction modulation element 30 corresponds to the fluorescence intensity Iv. Accordingly, the fluorescence polarization measurement device 100 can calculate the degree of polarization P from one piece of image data and can shorten the measurement time without switching either of the polarization direction of the excitation light EL emitted on the measurement target solution and the polarization direction of the fluorescence FL to be detected.

Next, detection processing of the fluorescence polarization measurement device 100 (that is, a measurement target substance detection method) is described while referencing FIGS. 12 and 13. As illustrated in FIG. 12, the detection processing includes, in order, degree of polarization measurement processing for calculating the degree of polarization P (step S100), and concentration calculation processing for detecting the concentration of the measurement target substance (step S200).

The degree of polarization measurement processing (step S100) is described while referencing FIG. 13. In the degree of polarization measurement processing (step S100), the degree of polarization P of the measurement target solution is calculated from the fluorescence FL that the measurement target solution, introduced into the microchannels 220 of the microdevice 200, emits. Firstly, the controller 70 controls the light source 12 to emit the excitation light EL, for which the polarization direction is spatially modulated by the predetermined frequency, on the measurement target solution introduced into the microchannels 220 of the microdevice 200 placed on the stage ST (step S110). Light including the excitation light EL emitted from the light source 12 passes through the first polarization adjustment element 20, the polarization direction modulation element 30, and the like, and is converted to excitation light EL for which polarization direction is spatially modulated by the predetermined frequency (the spatial frequency of the polarization direction modulation element 30). Then, the excitation light EL for which the polarization direction has been spatially modulated by the predetermined frequency is emitted on the measurement target solution. As a result, the fluorescence FL is emitted from the measurement target solution.

Next, the controller 70 detects, from among the fluorescence FL emitted from the measurement target solution, the spatial distribution of fluorescence intensity of the fluorescence FL having the polarization direction in the predetermined direction (the X direction) (step S120). Specifically, the fluorescence FL emitted from the measurement target solution passes through the dichroic mirror 40, the second polarization adjustment element 54, and the like, and enters the first light receiver 58A as fluorescence FL having the polarization direction in the predetermined direction (the X direction). The extractor 76 of the controller 70 obtains the spatial distribution of fluorescence intensity of the fluorescence FL from image data corresponding to the spatial distribution of fluorescence intensity of the fluorescence FL acquired from the first light receiver 58A.

Furthermore, the controller 70 extracts, from the obtained spatial distribution of fluorescence intensity of the fluorescence FL, the direct current component and the component having the frequency identical to the predetermined frequency (the spatial frequency of the polarization direction modulation element 30) (step S130). Specifically, the extractor 76 of the controller 70 performs Fourier transformation using the spatial frequency of the polarization direction modulation element 30 on the spatial distribution of fluorescence intensity and, then, performs inverse Fourier transformation. As a result, it is possible to extract the direct current component and the component having the frequency identical to the spatial frequency of the polarization direction modulation element 30. In addition to the fluorescence intensity, noise is also included in the detected spatial distribution of fluorescence intensity. The spatial frequency of the noise and the spatial frequency of the polarization direction modulation element 30 are different and, as such, it is possible to enhance the SN ratio of the fluorescence intensity of the fluorescence FL by extracting the component having the frequency identical to the spatial frequency of the polarization direction modulation element 30 from the detected spatial distribution of fluorescence intensity of the fluorescence FL.

The controller 70 calculates the degree of polarization P of the measurement target solution on the basis of the direct current component and the component having the frequency identical to the spatial frequency of the polarization direction modulation element 30 (step S140). Specifically, the degree of polarization calculator 78 of the controller 70 calculates the degree of polarization P with the maximum value of the component having the frequency identical to the spatial frequency of the polarization direction modulation element 30 as the fluorescence intensity Ih, and the minimum value of the component having the frequency identical to the spatial frequency of the polarization direction modulation element 30 as the fluorescence intensity Iv.

Returning to FIG. 12, next, the concentration calculation processing (step S200) is described. In the concentration calculation processing (step S200), the concentration of the measurement target substance included in the measurement target solution is calculated from the degree of polarization P calculated in step S140 and a calibration curve that is measured in advance. Specifically, the concentration calculator 80 of the controller 70 calculates the concentration of the measurement target substance from the degree of polarization P calculated by the degree of polarization calculator 78 and the calibration curve of the degree of polarization P and the concentration of the measurement target substance. When the concentration calculation processing (step S200) ends, the detection processing ends.

As described above, the fluorescence polarization measurement device 100 extracts, from the detected spatial distribution of fluorescence intensity of the fluorescence FL, the component that has the frequency identical to the predetermined frequency whereby the excitation light EL is spatially modulated and, as such, can suppress noise and can detect the degree of polarization P with high measurement sensitivity. Additionally, the fluorescence polarization measurement device 100 can suppress the influence of the intensity distribution of the excitation light EL and can detect the degree of polarization P with high measurement sensitivity. With the fluorescence polarization measurement device 100, the measurement sensitivity of the degree of polarization P is high and, as such, it is possible to accurately detect the measurement target substance even when the concentration of the measurement target substance is low.

Furthermore, the maximum value of the component having the frequency identical to the spatial frequency of the polarization direction modulation element 30 corresponds to the fluorescence intensity Ih, and the minimum value of the component having the frequency identical to the spatial frequency of the polarization direction modulation element 30 corresponds to the fluorescence intensity Iv and, as such, the fluorescence polarization measurement device 100 can calculate the degree of polarization P from one piece of image data.

Embodiment 2

In Embodiment 1, the detector 50 detects the spatial distribution of fluorescence intensity of the fluorescence FL having the polarization direction in the X direction. However, a configuration is possible in which the detector 50 detects the spatial distribution of fluorescence intensity of the fluorescence FL having the polarization direction in the X direction and the spatial distribution of fluorescence intensity of the fluorescence FL having the polarization direction in the Z direction.

As with the fluorescence polarization measurement device 100 of Embodiment 1, a fluorescence polarization measurement device 100 of the present embodiment includes a light source unit 10, a polarization direction modulation element 30, a dichroic mirror 40, an objective lens 42, a detector 50, and a controller 70. The configurations of the light source unit 10 to the objective lens 42 of the present embodiment are the same as in Embodiment 1 and, as such, the detector 50 and the controller 70 of the present embodiment are described.

As with the detector 50 of Embodiment 1, the detector 50 of the present embodiment includes an absorption filter 52, a second polarization adjustment element 54, an imaging lens 56, and a first light receiver 58A. The configurations of the absorption filter 52 and the imaging lens 56 of the present embodiment are the same as those of Embodiment 1.

The second polarization adjustment element 54 of the present embodiment switches, to the X direction and the Z direction, the polarization direction of the fluorescence FL emitted from the second polarization adjustment element 54. The fluorescence FL emitted from the second polarization adjustment element 54 of the present embodiment enters the first light receiver 58A through the imaging lens 56. The second polarization adjustment element 54 of the present embodiment is implemented as a TN liquid crystal cell, a rotatably held polarizing plate, or the like. The second polarization adjustment element 54 of the present embodiment is controlled by the detection controller 84 of the controller 70. Note that the light source unit 10 emits excitation light EL having the polarization direction in the X direction, and the fluorescence FL travels in the +Y direction. As such, the second polarization adjustment element 54 of the present embodiment switches the fluorescence FL emitted from the second polarization adjustment element 54 to a fluorescence FL having a polarization direction parallel to the polarization direction of the excitation light EL emitted from the light source unit 10 and to a fluorescence FL having a polarization direction perpendicular to the polarization direction of the excitation light EL emitted from the light source unit 10.

As with the first light receiver 58A of Embodiment 1, the first light receiver 58A of the present embodiment detects, as an image, the spatial distribution of fluorescence intensity of the fluorescence FL having the polarization direction in the X direction. Additionally, the first light receiver 58A of the present embodiment detects, as an image, the spatial distribution of fluorescence intensity of the fluorescence FL having the polarization direction in the Z direction. The first light receiver 58A of the present embodiment sends, to the controller 70, image data corresponding to the spatial distribution of fluorescence intensity of the fluorescence FL having the polarization direction in the X direction, and image data corresponding to the spatial distribution of fluorescence intensity of the fluorescence FL having the polarization direction in the Z direction.

The controller 70 of the present embodiment extracts, from the spatial distribution of fluorescence intensity of the fluorescence FL having the polarization direction in the X direction, a direct current component and a component having a frequency identical to the spatial frequency of the polarization direction modulation element 30. Additionally, the controller 70 of the present embodiment extracts, from the spatial distribution of fluorescence intensity of the fluorescence FL having the polarization direction in the Z direction, a direct current component and a component having a frequency identical to the spatial frequency of the polarization direction modulation element 30. The controller 70 of the present embodiment calculates the degree of polarization P of the measurement target solution on the basis of the extracted component and direct current component. Furthermore, the controller 70 of the present embodiment calculates the concentration of the measurement target substance from the degree of polarization P and a calibration curve. As with the controller 70 of Embodiment 1, the controller 70 of the present embodiment includes an input/output device 72 to a detection controller 84. The configurations of the input/output device 72, the storage 74, the concentration calculator 80, the light source controller 82, and the detection controller 84 of the present embodiment are the same as in Embodiment 1.

The extractor 76 of the present embodiment obtains the spatial distribution of fluorescence intensity of the fluorescence FL from the image data corresponding to the spatial distribution of fluorescence intensity of the fluorescence FL. In the present embodiment, the spatial distribution of fluorescence intensity of the fluorescence FL having the polarization direction in the X direction, and the spatial distribution of fluorescence intensity of the fluorescence FL having the polarization direction in the Z direction are obtained. As in Embodiment 1, the obtained spatial distributions of fluorescence intensity of the fluorescence FL include noise.

As with the extractor 76 of Embodiment 1, the extractor 76 of the present embodiment extracts, from the obtained spatial distributions of fluorescence intensity of the fluorescence FL, the direct current component and the component having the frequency identical to the spatial frequency of the polarization direction modulation element 30. That is, in the present embodiment, the extractor 76 extracts, from the spatial distribution of fluorescence intensity of the fluorescence FL having the polarization direction in the X direction, a direct current component (hereinafter referred to as "X direction direct current component") and a component having a frequency identical to the spatial frequency of the polarization direction modulation element 30 (hereinafter referred to as "X direction component"). Additionally, the extractor 76 extracts, from the spatial distribution of fluorescence intensity of the fluorescence FL having the polarization direction in the Z direction, a direct current component (hereinafter referred to as "Z direction direct current component") and a component having a frequency identical to the spatial frequency of the polarization direction modulation element 30 (hereinafter referred to as "Z direction component"). Due to this, as in Embodiment 1, the SN ratio of the fluorescence intensity of the fluorescence FL can be enhanced.

Figure 14:
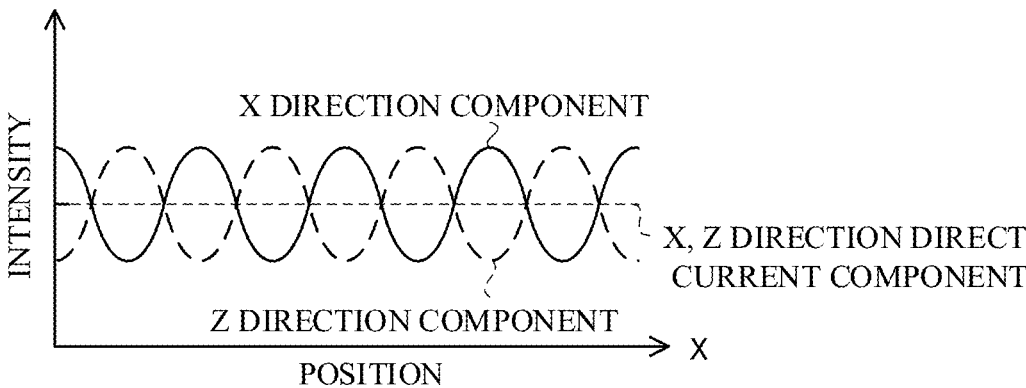
FIG. 14 is a drawing illustrating an X direction component, an X direction direct current component, a Z direction component, and a Z direction direct current component according to Embodiment 2.

Specifically, as in Embodiment 1, the extractor 76 of the present embodiment performs Fourier transformation and inverse Fourier transformation on the spatial distributions of fluorescence intensity of the fluorescence FL using the spatial frequency of the polarization direction modulation element 30. As a result, the X direction component, the X direction direct current component, the Z direction component, and the Z direction direct current component are obtained, such as illustrated in FIG. 14.

Figure 15:
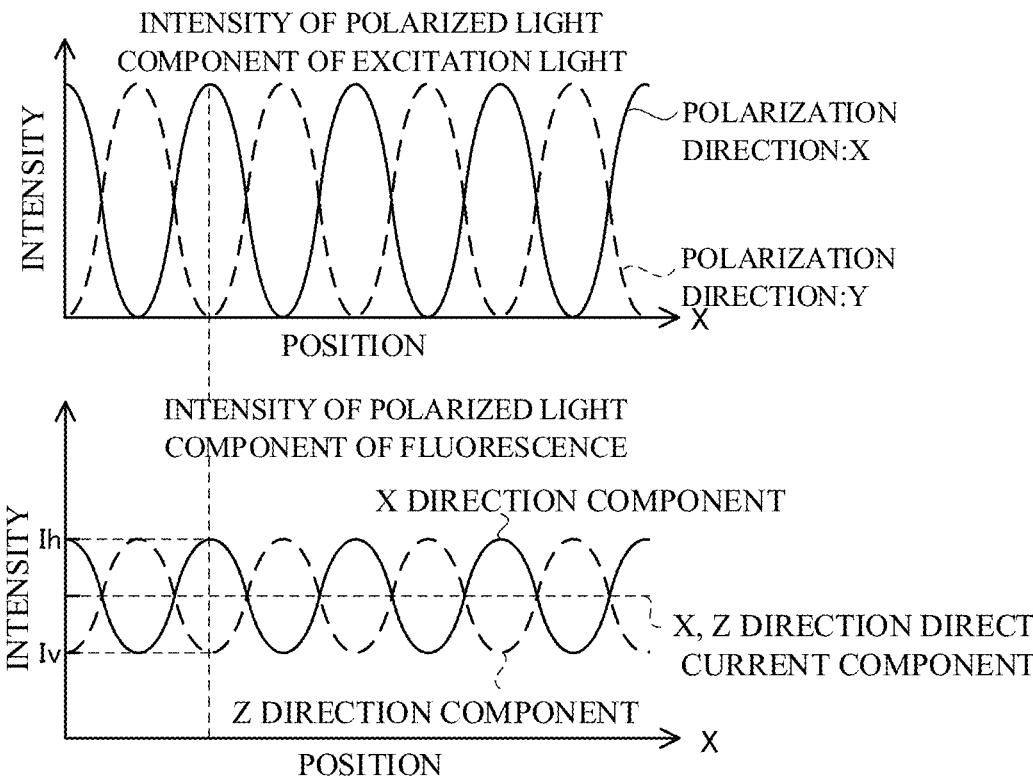
FIG. 15 is a drawing illustrating an intensity of a polarized light component of excitation light, and the X direction component, the X direction direct current component, the Z direction component, and the Z direction direct current component of fluorescence, according to Embodiment 2.

The degree of polarization calculator 78 of the present embodiment calculates the degree of polarization P from at least one of the X direction component and the X direction direct current component, and the Z direction component and the Z direction direct current component. As in Embodiment 1, in the present embodiment, excitation light EL, having the spatial distribution of intensity of the polarized light component, illustrated in FIG. 4 is emitted on the measurement target solution. Accordingly, as illustrated in FIG. 15, the intensities of the polarized light component of the excitation light EL, the X direction component, and the Z direction component are synchronized, and the maximum value of the X direction component (including the direct current component) or the Z direction component (including the direct current component) corresponds to the fluorescence intensity Ih of the fluorescence FL having the polarization direction parallel to the polarization direction of the excitation light EL. Additionally, the minimum value of the X direction component (including the direct current component) or the Z direction component (including the direct current component) corresponds to the fluorescence intensity Iv of the fluorescence FL having the polarization direction perpendicular to the polarization direction of the excitation light EL. Accordingly, the degree of polarization calculator 78 of the present embodiment calculates the degree of polarization P from the maximum value of the X direction component or the Z direction component, and the minimum value of the X direction component or the Z direction component.

In the present embodiment, as illustrated in FIG. 15, the fluorescence intensity Ih of the fluorescence FL and the fluorescence intensity Iv of the fluorescence FL are obtained at the same position (same X coordinate) of the microchannels 220. Accordingly, noise caused by foreign matter in the microchannels 220, bright spot noise of the first light receiver 58A, and the like can be easily found by comparing the fluorescence intensity Ih of the fluorescence FL and the fluorescence intensity Iv of the fluorescence FL at a plurality of positions.

Next, detection processing of the present embodiment is described. As in Embodiment 1, the detection processing of the present embodiment includes, in order, degree of polarization measurement processing (step S100), and concentration calculation processing (step S200) (FIG. 12). The concentration calculation processing (step S200) of the present embodiment is the same as in Embodiment 1 and, as such, the degree of polarization measurement processing (step S100) of the present embodiment is described while referencing FIG. 16.

In the degree of polarization measurement processing (step S100) of the present embodiment, firstly, the controller 70 controls the polarization direction of the fluorescence FL emitted from the second polarization adjustment element 54 to the X direction, and emits, on the measurement target solution, excitation light EL for which the polarization direction has been spatially modulated by the predetermined frequency (step S112a). Next, the controller 70, acquires, from the first light receiver 58A, image data corresponding to the spatial distribution of fluorescence intensity of the fluorescence FL having the polarization direction in the X direction among the fluorescence FL emitted from the measurement target solution (step S114a). Furthermore, the controller 70 controls the polarization direction of the fluorescence FL emitted from the second polarization adjustment element 54 to the Z direction, and emits, on the measurement target solution, excitation light EL for which the polarization direction has been spatially modulated by the predetermined frequency (step S112b). Then, the controller 70 acquires, from the first light receiver 58A, image data corresponding to the spatial distribution of fluorescence intensity of the fluorescence FL having the polarization direction in the Z direction among the fluorescence FL emitted from the measurement target solution (step S114b).

The controller 70 detects, from among the fluorescence FL emitted from the measurement target solution, the spatial distribution of fluorescence intensity of the fluorescence FL having the polarization direction in predetermined directions (the X direction and the Z direction) (step S120). Specifically, the extractor 76 of the controller 70 obtains, from image data corresponding to the spatial distribution of fluorescence intensity of the fluorescence FL having the polarization direction in the X direction, the spatial distribution of fluorescence intensity of the fluorescence FL having the polarization direction in the X direction. Additionally, the extractor 76 of the controller 70 obtains, from image data corresponding to the spatial distribution of fluorescence intensity of the fluorescence FL having the polarization direction in the Z direction, the spatial distribution of fluorescence intensity of the fluorescence FL having the polarization direction in the Z direction.

Furthermore, the controller 70 extracts, from the obtained spatial distributions of fluorescence intensity, direct current components and components having a frequency identical to a predetermined frequency (the spatial frequency of the polarization direction modulation element 30) (step S130). Specifically, the extractor 76 extracts an X direction component and an X direction direct current component from the spatial distribution of fluorescence intensity of the fluorescence FL having the polarization direction in the X direction. Additionally, the extractor 76 extracts a Z direction component and a Z direction direct current component from the spatial distribution of fluorescence intensity of the fluorescence FL having the polarization direction in the Z direction. As in Embodiment 1, the X direction component and the X direction direct current component, and the Z direction component and the Z direction direct current component are extracted by performing Fourier transformation and inverse Fourier transformation on the spatial distributions of fluorescence intensity using the spatial frequency of the polarization direction modulation element 30.

The controller 70 calculates the degree of polarization P of the measurement target solution on the basis of the direct current components and the components having the frequency identical to the spatial frequency of the polarization direction modulation element 30 (step S140). Specifically, the degree of polarization calculator 78 of the controller 70 calculates the degree of polarization P from the maximum value of the X direction component (including the direct current component) or the Z direction component (including the direct current component) and the minimum value of the X direction component (including the direct current component) or the Z direction component (including the direct current component).

As described above, as with the fluorescence polarization measurement device 100 of Embodiment 1, the fluorescence polarization measurement device 100 of the present embodiment can also suppress noise and detect the degree of polarization P with high measurement sensitivity. Additionally, the fluorescence polarization measurement device 100 of the present embodiment can suppress the influence of the intensity distribution of the excitation light EL, and can detect the degree of polarization P with high measurement sensitivity. Since the measurement sensitivity of the degree of polarization P is high, the fluorescence polarization measurement device 100 can accurately detect the measurement target substance even when the concentration of the measurement target substance is low.

Furthermore, the fluorescence polarization measurement device 100 of the present embodiment can easily find noise caused by foreign matter in the microchannels 220, bright spot noise of the first light receiver 58A, and the like.

Embodiment 3

In Embodiment 1, the light source unit 10 emits excitation light EL having the polarization direction in the X direction on the polarization direction modulation element 30. However, a configuration is possible in which the light source unit 10 switches the polarization direction of the excitation light EL between two orthogonal directions (the X direction and the Y direction).

As with the fluorescence polarization measurement device 100 of Embodiment 1, a fluorescence polarization measurement device 100 of the present embodiment includes a light source unit 10, a polarization direction modulation element 30, a dichroic mirror 40, an objective lens 42, a detector 50, and a controller 70. The configurations of the polarization direction modulation element 30 to the objective lens 42 of the present embodiment are the same as in Embodiment 1 and, as such, the light source unit 10, detector 50, and the controller 70 of the present embodiment are described.

As with the light source unit 10 of Embodiment 1, the light source unit 10 of the present embodiment includes a light source 12, a condenser lens 14, an iris 16, a collimator 18, a first polarization adjustment element 20, and an excitation light filter 22. The configurations of the light source 12 to the collimator 18, and the excitation light filter 22 of the present embodiment are the same as in Embodiment 1 and, as such, the first polarization adjustment element 20 of the present embodiment is described.

The first polarization adjustment element 20 of the present embodiment switches, to the X direction and the Y direction, the polarization direction of light including the excitation light EL emitted from the first polarization adjustment element 20. The first polarization adjustment element 20 of the present embodiment is implemented as a TN liquid crystal cell, a rotatably held polarizing plate, or the like. The first polarization adjustment element 20 of the present embodiment is controlled by the light source controller 82 of the controller 70.

The light emitted from the first polarization adjustment element 20 of the present embodiment is emitted from the light source unit 10 through the excitation light filter 22. Accordingly, the light source unit 10 of the present embodiment emits while switching the polarization direction of the excitation light EL to the X direction and the Y direction.

In the present embodiment, when excitation light EL having the polarization direction in the X direction is emitted from the light source unit 10, excitation light EL for which the intensity of the polarized light component is increased/decreased periodically by the spatial frequency of the polarization direction modulation element 30 is emitted on the measurement target solution (the microdevice 200) through the polarization direction modulation element 30. When excitation light EL having the polarization direction in the X direction is emitted from the light source unit 10, as in Embodiment 1, the intensities of the component having the polarization direction in the X direction and the component having the polarization direction in the Y direction in the excitation light EL increase/decrease periodically by the spatial frequency of the polarization direction modulation element 30, and are in opposite phases to each other (FIG. 4). In the following, the excitation light EL emitted on the measurement target solution when the excitation light EL having the polarization direction in the X direction is emitted from the light source unit 10 is referred to as "first excitation light EL."

Figure 17:
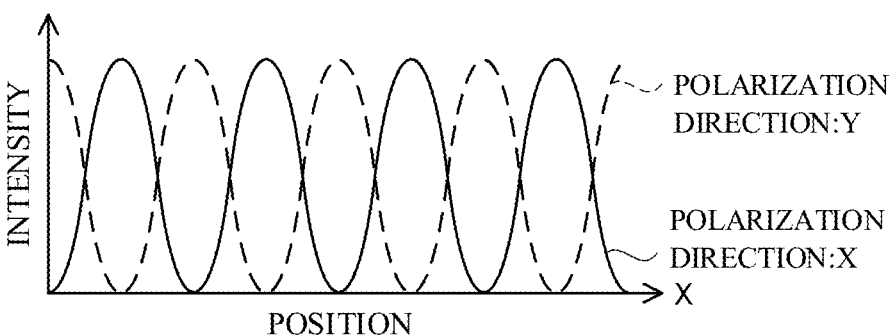
FIG. 17 is a drawing illustrating an intensity of a polarized light component of second excitation light according to Embodiment 3.

Meanwhile, when excitation light EL having the polarization direction in the Y direction is emitted from the light source unit 10, excitation light EL for which the component having the polarization direction in the X direction of the first excitation light EL is switched to a component having the polarization direction in the Y direction and the component having the polarization direction in the Y direction of the first excitation light EL is switched to a component having the polarization direction in the X direction (FIG. 17) is emitted on the measurement target solution. In the following, the excitation light EL emitted on the measurement target solution when the excitation light EL having the polarization direction in the Y direction is emitted from the light source unit 10 is referred to as "second excitation light EL."

As with the detector 50 of Embodiment 1, the detector 50 of the present embodiment includes an absorption filter 52, a second polarization adjustment element 54, an imaging lens 56, and a first light receiver 58A. The configurations of the absorption filter 52 to the imaging lens 56 of the present embodiment are the same as in Embodiment 1.

As with the first light receiver 58A of Embodiment 1, the first light receiver 58A of the present embodiment detects, as an image, a spatial distribution of fluorescence intensity of the fluorescence FL having the polarization direction in the X direction. In the present embodiment, the first light receiver 58A detects the spatial distribution of fluorescence intensity (hereinafter referred to as "the spatial distribution of first fluorescence intensity") of the fluorescence FL having the polarization direction in the X direction among the fluorescence FL light emitted from the measurement target solution when the first excitation light is emitted on the measurement target solution (that is, when the light source unit 10 emits the excitation light EL having the polarization direction in the X direction). Additionally, the first light receiver 58A detects the spatial distribution of fluorescence intensity (hereinafter referred to as "the spatial distribution of second fluorescence intensity") of the fluorescence FL having the polarization direction in the X direction among the fluorescence FL light emitted from the measurement target solution when the second excitation light is emitted on the measurement target solution (that is, when the light source unit 10 emits the excitation light EL having the polarization direction in the Y direction). The first light receiver 58A of the present embodiment sends, to the controller 70, image data corresponding to the spatial distribution of first fluorescence intensity and image data corresponding to the spatial distribution of second fluorescence intensity.

The controller 70 of the present embodiment extracts, from the spatial distribution of first fluorescence intensity, a direct current component and a component having a frequency identical to the spatial frequency of the polarization direction modulation element 30. Additionally, the controller 70 of the present embodiment extracts, from the spatial distribution of second fluorescence intensity, a direct current component and a component having a frequency identical to the spatial frequency of the polarization direction modulation element 30. The controller 70 of the present embodiment calculates the degree of polarization P of the measurement target solution on the basis of the extracted component and direct current component, and calculates the concentration of the measurement target substance from the degree of polarization P and a calibration curve. As with the controller 70 of Embodiment 1, the controller 70 of the present embodiment includes the input/output device 72 to the detection controller 84. The configurations of the input/output device 72, the storage 74, the concentration calculator 80, the light source controller 82, and the detection controller 84 of the present embodiment are the same as in Embodiment 1.

The extractor 76 of the present embodiment obtains spatial distributions of fluorescence intensity of the fluorescence FL from the image data corresponding to the spatial distributions of fluorescence intensity of the fluorescence FL. In the present embodiment, the extractor 76 obtains the spatial distribution of first fluorescence intensity and the spatial distribution of second fluorescence intensity. As in Embodiment 1, the obtained spatial distribution of the first fluorescence intensity and the spatial distribution of the second fluorescence intensity include noise.

As with the extractor 76 of Embodiment 1, the extractor 76 of the present embodiment extracts, from the obtained spatial distributions of the fluorescence intensity of the fluorescence FL, direct current components and components having a frequency identical to the spatial frequency of the polarization direction modulation element 30. That is, in the present embodiment, the extractor 76 extracts, from the spatial distribution of first fluorescence intensity, a direct current component (hereinafter referred to as "first direct current component") and a component (hereinafter referred to as "first component") having a frequency identical to the spatial frequency of the polarization direction modulation element 30. Additionally, the extractor 76 extracts, from the spatial distribution of second fluorescence intensity, a direct current component (hereinafter referred to as "second direct current component") and a component (hereinafter referred to as "second component") having a frequency identical to the spatial frequency of the polarization direction modulation element 30. As a result, as in Embodiment 1, the SN ratio of the fluorescence intensity of the fluorescence FL can be enhanced.

Figure 18:
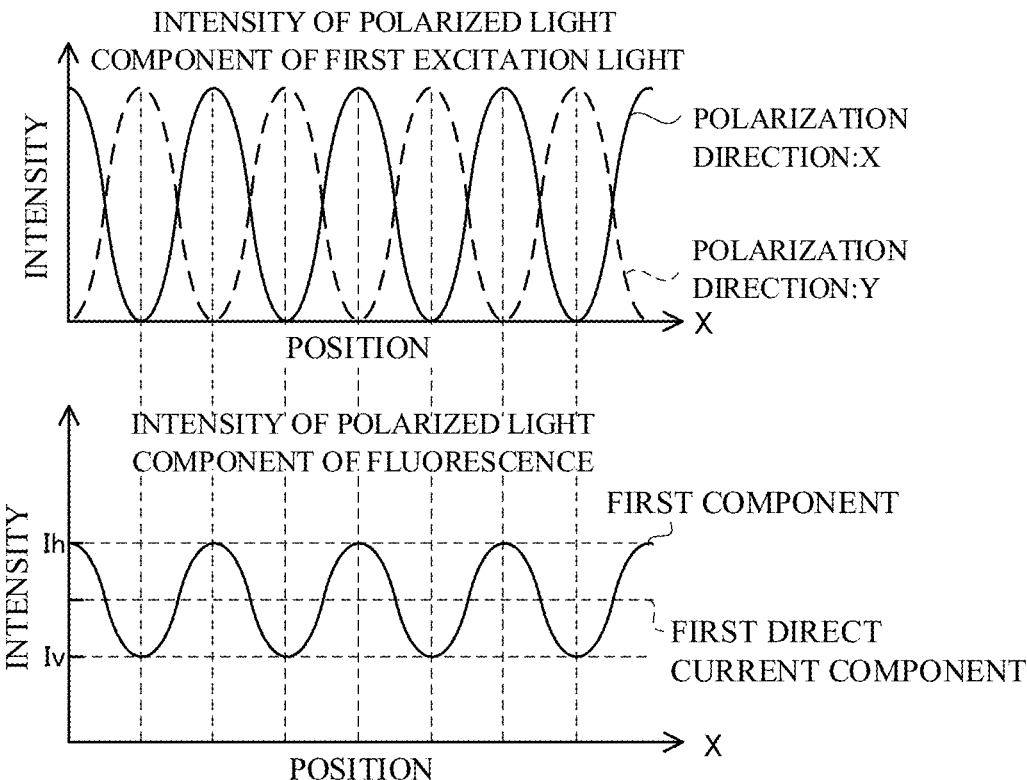
FIG. 18 is a drawing illustrating an intensity of a polarized light component of first excitation light, and a first direct current component and a first component of fluorescence, according to Embodiment 3.
Figure 19:
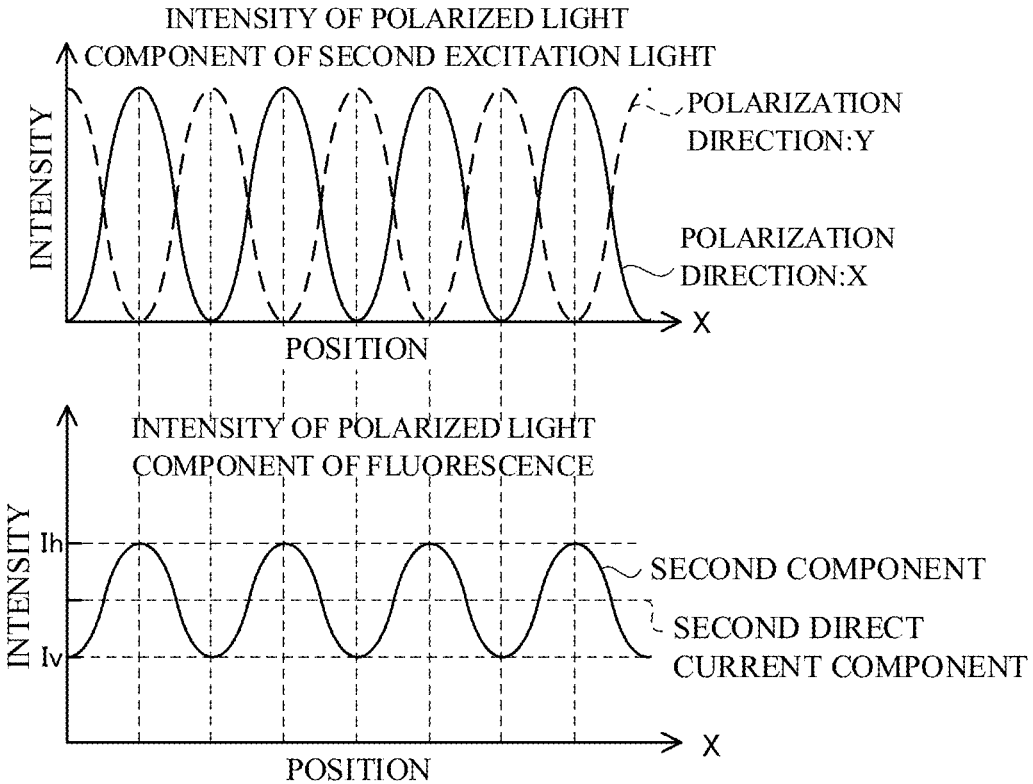
FIG. 19 is a drawing illustrating intensities of a polarized light component of second excitation light, and a second direct current component and a second component of the fluorescence, according to Embodiment 3.

Specifically, as in Embodiment 1, the extractor 76 of present embodiment performs Fourier transformation and inverse Fourier transformation on the spatial distribution of first fluorescence intensity using the spatial frequency of the polarization direction modulation element 30. As a result, the first component and the first direct current component such as illustrated in FIG. 18 are obtained. Additionally, the extractor 76 of the present embodiment performs Fourier transformation and inverse Fourier transformation on the spatial distribution of second fluorescence intensity using the spatial frequency of the polarization direction modulation element 30. As a result, the second component and the second direct current component such as illustrated in FIG. 19 are obtained.

The degree of polarization calculator 78 of the present embodiment calculates the degree of polarization P from the first component and the first direct current component, or the second component and the second direct current component. In the present embodiment, as in Embodiment 1, the maximum value of the first component (including the first direct current component) and the second component (including the second direct current component) corresponds to the fluorescence intensity Ih of the fluorescence FL having the polarization direction parallel to the polarization direction of the excitation light EL, as illustrated in FIGS. 18 and 19. Additionally, the minimum value of the first component (including the first direct current component) and the second component (including the second direct current component) corresponds to the fluorescence intensity Iv of the fluorescence FL having the polarization direction perpendicular to the polarization direction of the excitation light EL. Accordingly, in the present embodiment, the degree of polarization calculator 78 calculates the degree of polarization P from the maximum value and the minimum value of the first component or the maximum value and the minimum value of the second component.

Figure 20:
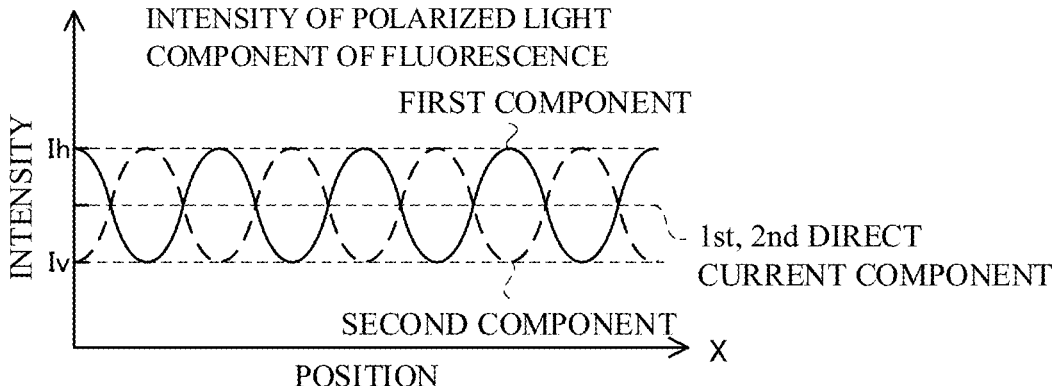
FIG. 20 is a drawing illustrating the first component, the first direct current component, the second component, and the second direct current component of the fluorescence, according to Embodiment 3.

In the present embodiment, as illustrated in FIG. 20, the first component and the second component have a reversed phase relationship, and the fluorescence intensity Ih of the fluorescence FL and the fluorescence intensity Iv of the fluorescence FL are obtained at the same position (the same X coordinate) of the microchannels 220. Accordingly, noise caused by foreign matter in the microchannels 220, bright spot noise of the first light receiver 58A, and the like can be easily found by comparing the fluorescence intensity Ih of the fluorescence FL and the fluorescence intensity Iv of the fluorescence FL of the first component and the second component.

Figure 21:
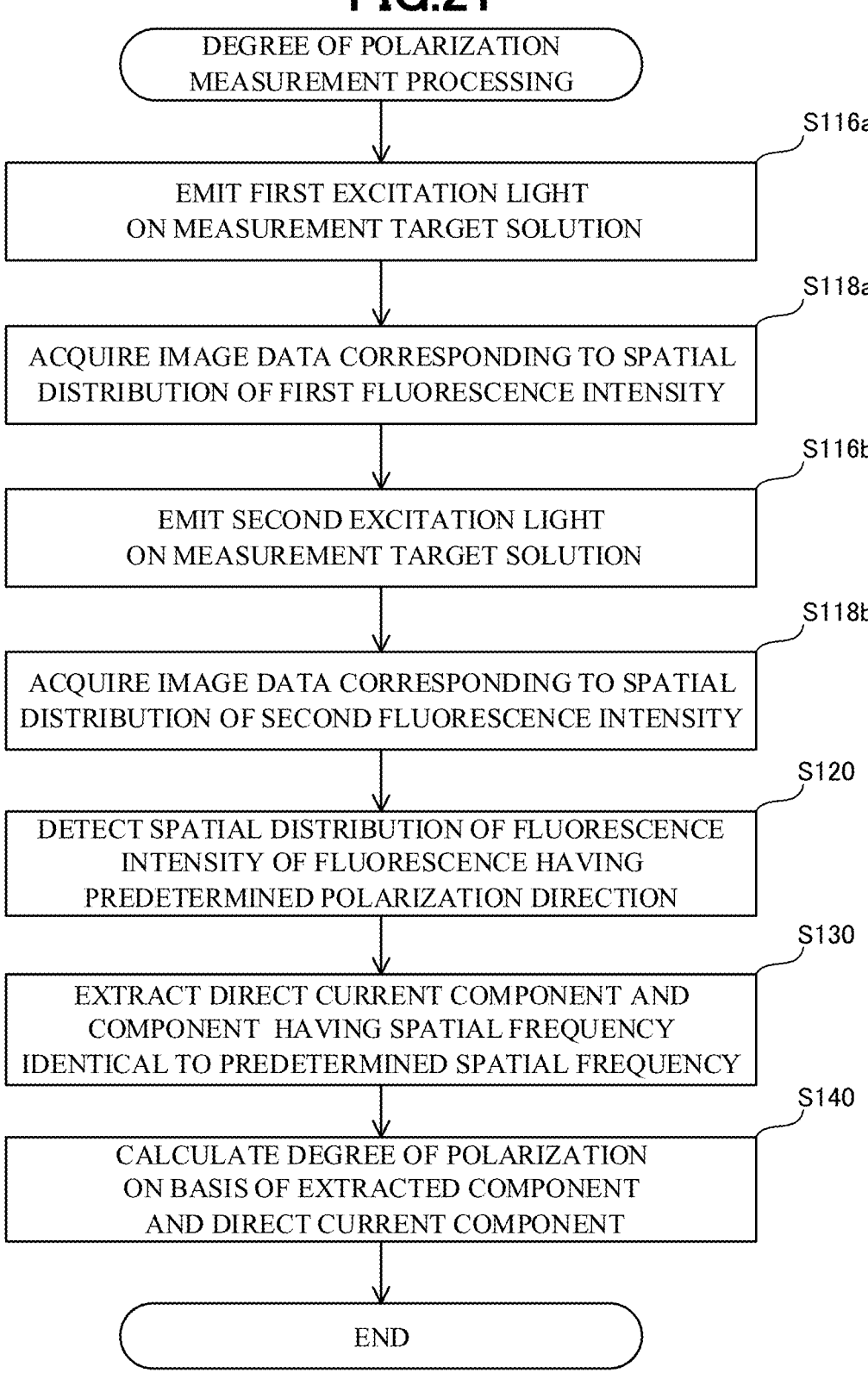
FIG. 21 is a flowchart illustrating degree of polarization measurement processing according to Embodiment 3.

Next, detection processing of the present embodiment is described. As in Embodiment 1, the detection processing of the present embodiment includes, in order, degree of polarization measurement processing (step S100), and concentration calculation processing (step S200) (FIG. 12). The concentration calculation processing (step S200) of the present embodiment is the same as in Embodiment 1 and, as such, the degree of polarization measurement processing (step S100) of the present embodiment is described while referencing FIG. 21.

In the degree of polarization measurement processing (step S100) of the present embodiment, firstly, the controller 70 controls the polarization direction of light emitted from the first polarization adjustment element 20 (the excitation light EL emitted from the light source unit 10) to the X direction, and emits the first excitation light EL on the measurement target solution (step S116a). Next, the controller 70 acquires image data corresponding to the spatial distribution of first fluorescence intensity from the first light receiver 58A (step S118a). Furthermore, the controller 70 controls the light emitted from the first polarization adjustment element 20 to the Y direction, and emits the second excitation light EL on the measurement target solution (step S116b). Next, the controller 70 acquires image data corresponding to the spatial distribution of second fluorescence intensity from the first light receiver 58A (step S118b).

The controller 70 detects, from among the fluorescence FL emitted from the measurement target solution, the spatial distributions of fluorescence intensity of the fluorescence FL having the polarization direction in the predetermined direction (the X direction) (step S120). Specifically, the extractor 76 of the controller 70 obtains the spatial distribution of first fluorescence intensity from image data corresponding to the spatial distribution of first fluorescence intensity. Additionally, the extractor 76 of the controller 70 obtains the spatial distribution of second fluorescence intensity from image data corresponding to the spatial distribution of second fluorescence intensity.

Furthermore, the controller 70 extracts, from the obtained spatial distributions of fluorescence intensity, direct current components and components having a frequency identical to a predetermined frequency (the spatial frequency of the polarization direction modulation element 30) (step S130). Specifically, the extractor 76 extracts the first component and the first direct current component from the spatial distribution of the first fluorescence intensity. Additionally, the extractor 76 extracts the second component and the second direct current component from the spatial distribution of the second fluorescence intensity. As in Embodiment 1, the first component and the first direct current component, and the second component and the second direct current component are extracted by performing Fourier transformation and inverse Fourier transformation on the spatial distributions of fluorescence intensity using the spatial frequency of the polarization direction modulation element 30.

The controller 70 calculates the degree of polarization P of the measurement target solution on the basis of the direct current components and the components having the frequency identical to the spatial frequency of the polarization direction modulation element 30 (step S140). Specifically, the degree of polarization calculator 78 of the controller 70 calculates the degree of polarization P from the maximum value and the minimum value of the first component (including the direct current component) or the maximum value and the minimum value of the second component (including the direct current component).

As described above, as with the fluorescence polarization measurement device 100 of Embodiment 1, the fluorescence polarization measurement device 100 of the present embodiment can also suppress noise and detect the degree of polarization P with high measurement sensitivity. Additionally, the fluorescence polarization measurement device 100 of the present embodiment can suppress the influence of the intensity distribution of the excitation light EL, and can detect the degree of polarization P with high measurement sensitivity. Since the measurement sensitivity of the degree of polarization P is high, the fluorescence polarization measurement device 100 can accurately detect the measurement target substance even when the concentration of the measurement target substance is low. Furthermore, the fluorescence polarization measurement device 100 of the present embodiment can easily find noise caused by foreign matter in the microchannels 220, bright spot noise of the first light receiver 58A, and the like.

Embodiment 4

In Embodiment 2, the detector 50 detects the spatial distribution of fluorescence intensity of the fluorescence FL having the polarization direction in the X direction and the spatial distribution of fluorescence intensity of the fluorescence FL having the polarization direction in the Z direction by switching the polarization direction of the fluorescence FL emitted from the second polarization adjustment element 54 to the X direction and the Z direction. However, a configuration is possible in which the detector 50 detects the spatial distribution of fluorescence intensity of the fluorescence FL having the polarization direction in the X direction and the spatial distribution of fluorescence intensity of the fluorescence FL having the polarization direction in the Y direction by separating the polarized light component of the fluorescence FL.

As with the fluorescence polarization measurement device 100 of Embodiment 1, a fluorescence polarization measurement device 100 of the present embodiment includes a light source unit 10, a polarization direction modulation element 30, a dichroic mirror 40, an objective lens 42, a detector 50, and a controller 70. The configurations of the light source unit 10 to the objective lens 42 of the present embodiment are the same as in Embodiment 1 and, as such, the detector 50 and the controller 70 of the present embodiment are described.

Figure 22:
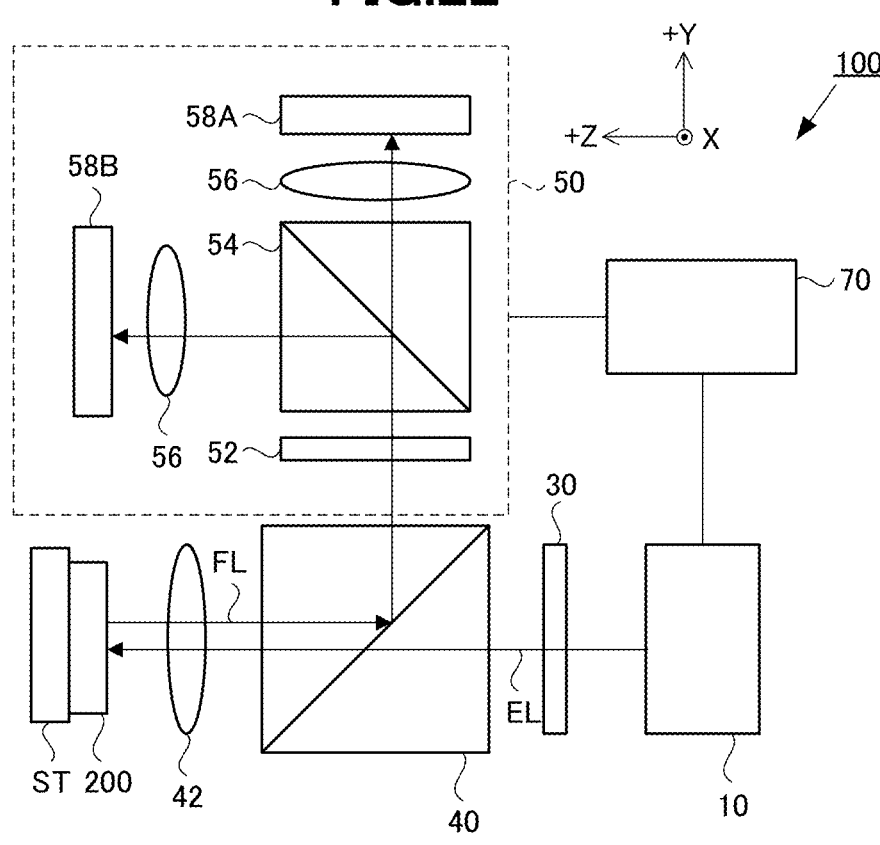
FIG. 22 is a schematic drawing illustrating a fluorescence polarization measurement device according to Embodiment 4.

As illustrated in FIG. 22, the detector 50 of the present embodiment includes an absorption filter 52, a second polarization adjustment element 54, two imaging lenses 56, a first light receiver 58A, and a second light receiver 58B. The configuration of the absorption filter 52 of the present embodiment is the same as in Embodiment 1.

The second polarization adjustment element 54 of the present embodiment is implemented as a polarizing beam splitter. In the present embodiment, of the fluorescence FL entering from the −Y direction, the second polarization adjustment element 54 transmits the fluorescence FL having the polarization direction in the X direction, and reflects, in the +Z direction, the fluorescence FL having the polarization direction in the Z direction as fluorescence FL having the polarization direction in the Y direction.

The fluorescence FL having the polarization direction in the X direction enters the first light receiver 58A through the imaging lens 56. Additionally, the fluorescence FL having the polarization direction in the Y direction enters the second light receiver 58B through the imaging lens 56.

As with the first light receiver 58A of Embodiment 1, the first light receiver 58A of the present embodiment detects, as an image, a spatial distribution of fluorescence intensity of the fluorescence FL having the polarization direction in the X direction. The first light receiver 58A of the present embodiment sends, to the controller 70, image data corresponding to the spatial distribution of fluorescence intensity of the fluorescence FL having the polarization direction in the X direction.

In one example, the second light receiver 58B is implemented as a charge coupled device (CCD) image sensor. The spatial distribution of fluorescence intensity of the fluorescence FL having the polarization direction in the Y direction is detected as an image. The second light receiver 58B sends, to the controller 70, image data corresponding to the spatial distribution of fluorescence intensity of the fluorescence FL having the polarization direction in the Y direction.

The controller 70 of the fluorescence polarization measurement device 100 extracts a direct current component (X direction direct current component) and a component (X direction component) having a frequency identical to the spatial frequency of the polarization direction modulation element 30, from the spatial distribution of fluorescence intensity of the fluorescence FL having the polarization direction in the X direction detected by the first light receiver 58A. Additionally, the controller 70 of the present embodiment extracts a direct current component (hereinafter referred to as "Y direction direct current component") and a component (hereinafter referred to as "Y direction component") having a frequency identical to the spatial frequency of the polarization direction modulation element 30, from the spatial distribution of fluorescence intensity of the fluorescence FL having the polarization direction in the Y direction detected by the second light receiver 58B. The controller 70 of the present embodiment calculates the degree of polarization P of the measurement target solution on the basis of the extracted components and direct current components, and calculates the concentration of the measurement target substance from the degree of polarization P and a calibration curve.

As with the controller 70 of Embodiment 1 and Embodiment 2, the controller 70 of the present embodiment includes an input/output device 72 to a detection controller 84. The configurations of the various components of the controller 70 of the present embodiment are the same as the configurations of the various components of the controller 70 of Embodiment 2, except for using the spatial distribution of fluorescence intensity of the fluorescence FL having the polarization direction in the Y direction instead of the spatial distribution of fluorescence intensity of the fluorescence FL having the polarization direction in the Z direction of Embodiment 2.

Figure 23:
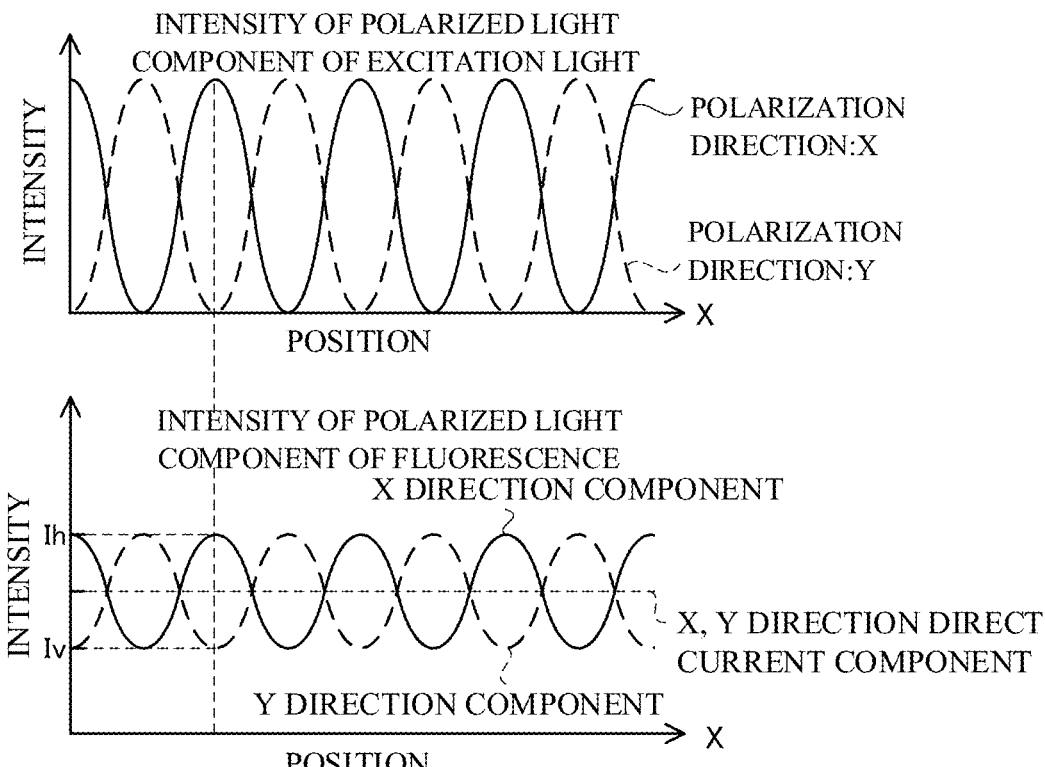
FIG. 23 is a drawing illustrating intensities of a polarized light component of excitation light, and an X direction component, an X direction direct current component, a Y direction component, and a Y direction direct current component of fluorescence, according to Embodiment 4.

As illustrated in FIG. 23, in the present embodiment, the maximum value of the X direction component (including the direct current component) or the Y direction component (including the direct current component) corresponds to the fluorescence intensity Ih of the fluorescence FL having the polarization direction parallel to the polarization direction of the excitation light EL. Additionally, the minimum value of the X direction component (including the direct current component) or the Y direction component (including the direct current component) corresponds to the fluorescence intensity Iv of the fluorescence FL having the polarization direction perpendicular to the polarization direction of the excitation light EL. The degree of polarization P is calculated from the maximum value of the X direction component or the Y direction component, and the minimum value of the X direction component or the Y direction component. Furthermore, the concentration of the measurement target substance is calculated from a calibration curve of the degree of polarization P and the concentration of the measurement target substance.

As with the fluorescence polarization measurement device 100 of Embodiment 2, the fluorescence polarization measurement device 100 of the present embodiment can suppress noise and detect the degree of polarization P with high measurement sensitivity. Additionally, the fluorescence intensity Ih of the fluorescence FL and the fluorescence intensity Iv of the fluorescence FL are obtained at the same position (the same X coordinate) of the microchannels 220 and, as such, the fluorescence polarization measurement device 100 of the present embodiment can easily find noise caused by foreign matter in the microchannels 220, bright spot noise of the first light receiver 58A, and the like. Furthermore, the fluorescence polarization measurement device 100 of the present embodiment can measure the degree of polarization P without switching either of the polarization direction of the excitation light EL emitted on the measurement target solution and the polarization direction of the fluorescence FL to be detected and, and such, can shorten the measurement time.

Modified Examples

Embodiments have been described, but various modifications can be made to the present disclosure without departing from the spirit and scope of the present disclosure.

For example, in the embodiments described above, the microdevice 200 includes three microchannels 220. It is sufficient that the microdevice 200 includes at least one microchannel 220. A configuration is possible in which the microdevice 200 includes a plurality of microchannels 220.

A configuration is possible in which the first light receiver 58A and the second light receiver 58B are implemented as complementary metal oxide semiconductor (CMOS) image sensors. Additionally, the first light receiver 58A and the second light receiver 58B are not limited to imaging elements.

In Embodiments 1 to 4, the polarization direction modulation element 30 continuously modulates, along the X direction, the polarization direction of the excitation light EL by the predetermined frequency. However, it is sufficient that the polarization direction modulation element 30 modulates the polarization direction of the excitation light EL by the predetermined frequency, and the polarization direction need not necessarily be continuously modulated. It is sufficient that the polarization direction modulation element 30 modulates the polarization direction of the excitation light EL so that the controller 70 can extract, from the fluorescence intensity, a component having a frequency identical to the spatial frequency of the polarization direction modulation element 30.

In the detection processing of Embodiment 2, image data corresponding to the spatial distribution of fluorescence intensity of the fluorescence FL having the polarization direction in the X direction is acquired and, then, image data corresponding to the spatial distribution of fluorescence intensity of the fluorescence FL having the polarization direction in the Z direction is acquired (step S112a, S114a, then step S112b, S114b). However, in Embodiment 2, a configuration is possible in which image data corresponding to the spatial distribution of fluorescence intensity of the fluorescence FL having the polarization direction in the Z direction is acquired and, then, image data corresponding to the spatial distribution of fluorescence intensity of the fluorescence FL having the polarization direction in the X direction is acquired (step S112b, S114b, then step S112a, S114a).

In the detection processing of Embodiment 3, image data corresponding to the spatial distribution of first fluorescence intensity is acquired and, then, image data corresponding to the spatial distribution of second fluorescence intensity is acquired (step S116a, S118a, then step S116b, S118b). In Embodiment 3, a configuration is possible in which image data corresponding to the spatial distribution of second fluorescence intensity is acquired and, then, image data corresponding to the spatial distribution of first fluorescence intensity is acquired (step S116b, S118b, then step S116a, S118a).

A configuration is possible in which, in the degree of polarization measurement processing, the spatial distribution of fluorescence intensity is detected from a plurality of image data.

Furthermore, a configuration is possible in which, in the degree of polarization measurement processing, background fluorescence intensity is detected without emitting the excitation light EL. A configuration is possible in which the background fluorescence intensity is subtracted from the detected spatial distribution of fluorescence intensity and, then, a direct current component and a component having a frequency identical to the spatial frequency of the polarization direction modulation element 30 are extracted. As a result, dark noise of the first light receiver 58A and the second light receiver 58B, noise from the circuits of the first light receiver 58A and the second light receiver 58B, and the like can be suppressed.

Figure 24:
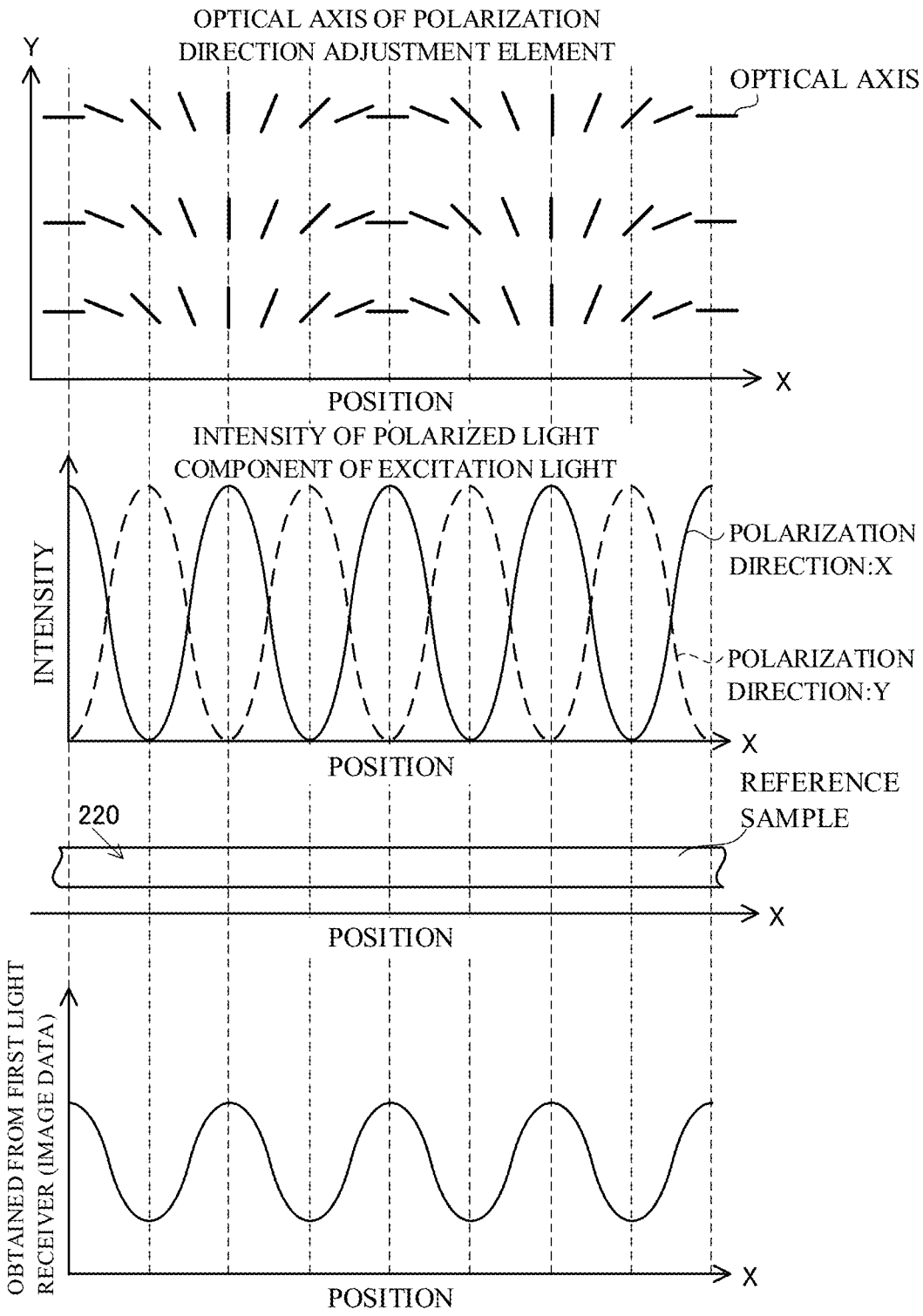
FIG. 24 is a drawing illustrating an optical axis of a polarization direction modulation element, an intensity of a polarized light component of excitation light, and a fluorescence intensity.

A configuration is possible in which, in the fluorescence polarization measurement device 100, the excitation light EL is emitted on a reference sample that emits fluorescence to position the polarization direction modulation element 30 and the first light receiver 58A (the first light receiver 58A and the second light receiver 58B) such that the polarization direction of the excitation light EL and the positions of the maximum value and the minimum value of the fluorescence intensity align (FIG. 24).

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

The invention claimed is:

1. A fluorescence polarization measurement device, comprising:
   a light source unit that emits excitation light that is linearly polarized;
   a polarization direction modulation element that spatially modulates a polarization direction of the excitation light by a predetermined frequency, and emits, on a measurement target solution, the excitation light for which the polarization direction is spatially modulated by the predetermined frequency;
   a detector that detects a spatial distribution of fluorescence intensity of the fluorescence having a polarization direction in a predetermined direction from among fluorescence emitted from the measurement target solution due to the excitation light for which the polarization direction is spatially modulated by the predetermined frequency; and
   a controller that extracts, from the detected spatial distribution of fluorescence intensity, a direct current component and a component having a frequency identical to the predetermined frequency, and calculates, based on the extracted component and the direct current component, a degree of polarization of the measurement target solution.

2. The fluorescence polarization measurement device according to claim 1, wherein the light source unit emits while switching the polarization direction of the excitation light to two orthogonal directions.

3. The fluorescence polarization measurement device according to claim 1, wherein the detector includes a polarization adjustment element that selects, from among the fluorescence emitted from the measurement target solution, the fluorescence having the polarization direction in the predetermined direction, and a light receiver that detects the spatial distribution of fluorescence intensity of the fluorescence having the polarization direction in the predetermined direction.

4. The fluorescence polarization measurement device according to claim 3, wherein the polarization adjustment element switches the fluorescence having the polarization direction in the predetermined direction to fluorescence having a polarization direction parallel to the polarization direction of the excitation light emitted from the light source unit, and fluorescence having a polarization direction perpendicular to the polarization direction of the excitation light emitted from the light source unit.

5. The fluorescence polarization measurement device according to claim 3, wherein the polarization adjustment element is a polarizing beam splitter.

6. The fluorescence polarization measurement device according to claim 1, wherein the measurement target solution includes a measurement target substance, a fluorescence-labeled derivative obtained by fluorescently labeling the measurement target substance, and an antibody that specifically binds to the measurement target substance.

7. A degree of polarization measurement method comprising:
   emitting, on a measurement target solution, excitation light for which a polarization direction has been spatially modulated by a predetermined frequency;
   detecting, from among fluorescence emitted from the measurement target solution, a spatial distribution of fluorescence intensity of the fluorescence having a polarization direction in a predetermined direction;
   extracting, from the detected spatial distribution of fluorescence intensity, a direct current component and a component having a frequency identical to the predetermined frequency; and
   calculating, based on the extracted component and the direct current component, a degree of polarization of the measurement target solution.

8. The fluorescence polarization measurement device according to claim 3, wherein the polarization adjustment element is a TN liquid crystal cell.

9. The fluorescence polarization measurement device according to claim 3, wherein the polarization adjustment element is a rotatably held polarizing plate.

* * * * *